(12) United States Patent
Fujiki et al.

(10) Patent No.: US 12,101,555 B2
(45) Date of Patent: Sep. 24, 2024

(54) IMAGING SUPPORT DEVICE, IMAGING APPARATUS, IMAGING SYSTEM, IMAGING SUPPORT METHOD, AND PROGRAM

(71) Applicant: FUJIFILM CORPORATION, Tokyo (JP)

(72) Inventors: Shinichiro Fujiki, Saitama (JP); Tetsuya Fujikawa, Saitama (JP); Junichi Tanaka, Saitama (JP); Atsushi Kawanago, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 219 days.

(21) Appl. No.: 17/752,872

(22) Filed: May 25, 2022

(65) Prior Publication Data

US 2022/0286613 A1    Sep. 8, 2022

Related U.S. Application Data

(63) Continuation of application No. PCT/JP2020/039906, filed on Oct. 23, 2020.

(30) Foreign Application Priority Data

Nov. 29, 2019  (JP) ................. 2019-217521

(51) Int. Cl.
*H04N 23/68* (2023.01)
*G03B 17/56* (2021.01)
(Continued)

(52) U.S. Cl.
CPC ........... *H04N 23/683* (2023.01); *H04N 23/55* (2023.01); *H04N 23/685* (2023.01); *G08B 13/1963* (2013.01); *G08B 13/19632* (2013.01)

(58) Field of Classification Search
CPC ... H04N 23/683; G03B 17/563; G03B 17/566
(Continued)

(56) References Cited

U.S. PATENT DOCUMENTS

| 5,227,889 A | 7/1993 | Yoneyama et al. |
| 6,992,700 B1 | 1/2006 | Sato et al. |

(Continued)

FOREIGN PATENT DOCUMENTS

| CN | 107809594 A | 3/2018 |
| JP | H04-211583 A | 8/1992 |

(Continued)

OTHER PUBLICATIONS

English language translation of the following: Office action dated Sep. 6, 2022 from the JPO in a Japanese patent application No. 2021-561229 corresponding to the instant patent application.

(Continued)

*Primary Examiner* — Anthony J Daniels
(74) *Attorney, Agent, or Firm* — SOLARIS Intellectual Property Group, PLLC

(57) ABSTRACT

An imaging support device includes a processor, and a memory that is connected to or incorporated in the processor, in which the processor is configured to derive information related to inclination of an imaging apparatus with respect to a revolution mechanism that enables the imaging apparatus to revolve about each of a first axis and a second axis intersecting with the first axis as a central axis, based on a time series change in revolution angle of the imaging apparatus, the inclination of the imaging apparatus being inclination in a rotation direction about a third axis intersecting with the first axis and the second axis as the central axis, and adjust a position of a captured image obtained by imaging performed by the imaging apparatus based on the information related to the inclination.

21 Claims, 30 Drawing Sheets

(51) Int. Cl.
*G08B 13/196* (2006.01)
*H04N 23/55* (2023.01)

(58) Field of Classification Search
USPC ................................................ 348/207.99
See application file for complete search history.

(56) References Cited

U.S. PATENT DOCUMENTS

| | | | |
|---|---|---|---|
| 2007/0035617 A1* | 2/2007 | Ko | G06T 7/20 |
| | | | 348/143 |
| 2008/0115562 A1* | 5/2008 | Haino | H04N 23/68 |
| | | | 73/1.37 |
| 2016/0255273 A1 | 9/2016 | Wakamatsu | |
| 2018/0316865 A1 | 11/2018 | Wakamatsu | |
| 2019/0208127 A1* | 7/2019 | Murakami | G02B 27/646 |
| 2019/0230287 A1* | 7/2019 | Shingu | H04N 23/55 |
| 2020/0332944 A1* | 10/2020 | Su | F16M 13/00 |
| 2021/0075967 A1* | 3/2021 | Yukitake | H04N 23/683 |

FOREIGN PATENT DOCUMENTS

| | | |
|---|---|---|
| JP | 2005-210507 A | 8/2005 |
| JP | 2008-129088 A | 6/2008 |
| JP | 2011-166371 A | 8/2011 |
| JP | 2013-179431 A | 9/2013 |
| JP | 2014-202793 A | 10/2014 |
| JP | 2018-189730 A | 11/2018 |

OTHER PUBLICATIONS

International Search Report issued in International Application No. PCT/JP2020/039906 on Jan. 12, 2021.
Written Opinion of the ISA issued in International Application No. PCT/JP2020/039906 on Jan. 12, 2021.
English language translation of the following: Office action dated Jan. 18, 2024 from the SIPO in a Chinese patent application No. 202080082736.1 corresponding to the instant patent application. This office action translation is submitted now in order to supplement the understanding of the cited references which are being disclosed in the instant Information Disclosure Statement.

* cited by examiner

[INITIAL STATE]

IMAGING SUPPORT DEVICE, IMAGING APPARATUS, IMAGING SYSTEM, IMAGING SUPPORT METHOD, AND PROGRAM

CROSS-REFERENCE TO RELATED APPLICATIONS

This application is a continuation application of International Application No. PCT/JP2020/039906, filed Oct. 23, 2020, the disclosure of which is incorporated herein by reference in its entirety. Further, this application claims priority from Japanese Patent Application No. 2019-217521, filed Nov. 29, 2019, the disclosure of which is incorporated herein by reference in its entirety.

BACKGROUND

1. Technical Field

The present disclosure relates to an imaging support device, an imaging apparatus, an imaging system, an imaging support method, and a program.

2. Related Art

JP2005-210507A discloses an imaging apparatus comprising an imaging unit that acquires a captured image by imaging a subject, an imaging direction inclination angle acquisition unit that acquires an inclination angle of an imaging direction of the imaging unit from a horizontal direction as an imaging direction inclination angle, an image correction unit that corrects the captured image to rectify inclination of the subject in a vertical direction in the captured image due to the inclination of the imaging direction from the horizontal direction based on the imaging direction inclination angle, and an image output unit that outputs the image corrected by the image correction unit.

JP1992-211583A (JP-H4-211583A) discloses a video camera apparatus configured with an imaging lens, a photoelectric conversion unit, a storage device, an inclination detection unit, a storage unit control device, and an output terminal. The storage device is configured with a first switch, a first storage unit, a second storage unit, and a second switch. An incidence ray that has passed through the imaging lens is subjected to photoelectric conversion by the photoelectric conversion unit and then, is input into the storage device as an electric signal. The signal input into the storage device is input into the first switch. The first switch turns to the first storage unit side across a first field period and turns to the second storage unit side across a subsequent second field period. A video signal stored in the first storage unit across the first field period is read out across the subsequent second field period. A video signal stored in the second storage unit across the second field period is read out across the subsequent first field. The second switch performs an operation having an opposite phase to the first switch and outputs one serial signal to the output terminal by alternately turning to the first storage unit and the second storage unit. Inclination information detected by the inclination detection unit is input into the storage unit control device. The storage unit control device outputs a signal to correct inclination of an output motion picture image signal in real time by controlling reading operations of the first storage unit and the second storage unit of the storage device in accordance with the inclination information.

JP2013-179431A discloses an imaging system consisting of an imaging apparatus, a pan head connectable to the imaging apparatus, and a communication unit that communicates between the imaging apparatus and the pan head. The imaging apparatus includes an inclination detection unit that detects an inclination degree of a roll direction with respect to an imaging optical axis. The pan head includes a reception unit that receives a detection result of the inclination detection unit through the communication unit, and a rotational driving unit that rotates the imaging apparatus in a direction about the imaging optical axis. The rotational driving unit rotates the imaging apparatus based on a detection result of the inclination detection unit so that a captured image of the imaging apparatus is horizontal with respect to a horizontal plane.

SUMMARY

One embodiment according to the disclosed technology provides an imaging support device, an imaging apparatus, an imaging system, an imaging support method, and a program that can resolve misregistration of a captured image in a case where the imaging apparatus is attached to a revolution mechanism in an inclined manner.

A first aspect according to the disclosed technology is an imaging support device comprising a processor, and a memory that is connected to or incorporated in the processor, in which the processor is configured to derive information related to inclination of an imaging apparatus with respect to a revolution mechanism that enables the imaging apparatus to revolve about each of a first axis and a second axis intersecting with the first axis as a central axis, based on a time series change in revolution angle of the imaging apparatus, the inclination of the imaging apparatus being inclination in a rotation direction about a third axis intersecting with the first axis and the second axis as a central axis, and adjust a position of a captured image obtained by imaging performed by the imaging apparatus based on the information related to the inclination.

A second aspect according to the disclosed technology is the imaging support device according to the first aspect according to the disclosed technology, in which the information related to the inclination is derived by the processor based on the time series change in a state where the imaging apparatus is caused to revolve about the first axis or the second axis as a central axis by the revolution mechanism.

A third aspect according to the disclosed technology is the imaging support device according to the second aspect according to the disclosed technology, in which the information related to the inclination is derived by the processor based on the time series change in a state where the imaging apparatus is caused to revolve in one direction of a revolution direction about the first axis or the second axis as a central axis.

A fourth aspect according to the disclosed technology is the imaging support device according to the second or third aspect according to the disclosed technology, in which the information related to the inclination is derived by the processor in a case where an amount of change in revolution angle about the first axis as a central axis is greater than or equal to a first predetermined value, and an amount of change in revolution angle about the second axis as a central axis is greater than or equal to a second predetermined value.

A fifth aspect according to the disclosed technology is the imaging support device according to any one of the first to fourth aspects according to the disclosed technology, in which the information related to the inclination is an angle of the inclination of the imaging apparatus with respect to a central axis of the revolution by the revolution mechanism.

A sixth aspect according to the disclosed technology is the imaging support device according to the fifth aspect according to the disclosed technology, in which the processor is configured to derive the angle of the inclination based on a degree of difference between a displacement amount of the revolution angle per unit time period about the first axis and a displacement amount of the revolution angle per unit time period about the second axis.

A seventh aspect according to the disclosed technology is the imaging support device according to the sixth aspect according to the disclosed technology, in which the degree of difference is a ratio of the displacement amount of the revolution angle per unit time period about the first axis and the displacement amount of the revolution angle per unit time period about the second axis.

An eighth aspect according to the disclosed technology is the imaging support device according to any one of the fifth to seventh aspects according to the disclosed technology, in which the processor is configured to derive the angle of the inclination based on Expression (1) below in a state where the imaging apparatus is caused to revolve about the first axis or the second axis as a central axis by the revolution mechanism.

$$\theta = \arctan(T2/T1) \quad (1)$$

θ: the angle of the inclination of the imaging apparatus (degree)

T1: the displacement amount of the revolution angle per unit time period about one axis of the first axis and the second axis (degree/s)

T2: the displacement amount of the revolution angle per unit time period about the other axis of the first axis and the second axis (degree/s)

A ninth aspect according to the disclosed technology is the imaging support device according to any one of the first to eighth aspects according to the disclosed technology, in which the processor is configured to derive a reliability degree of the information related to the inclination and, in a case where the derived reliability degree is greater than a predetermined degree, adjust the position based on the information related to the inclination.

A tenth aspect according to the disclosed technology is the imaging support device according to the ninth aspect according to the disclosed technology, in which the reliability degree is a standard deviation of a data group of the information related to the inclination, and the processor is configured to, in a case where the standard deviation is less than or equal to a threshold value, adjust the position based on the information related to the inclination.

An eleventh aspect according to the disclosed technology is the imaging support device according to any one of the first to tenth aspects according to the disclosed technology, in which the imaging apparatus includes a sensor that detects the rotation direction and a rotation speed of the imaging apparatus, and the time series change is derived by the processor based on a detection result of the sensor.

A twelfth aspect according to the disclosed technology is the imaging support device according to the eleventh aspect according to the disclosed technology, in which the sensor is a gyro sensor that detects an angular velocity about the first axis or the second axis as a central axis.

A thirteenth aspect according to the disclosed technology is the imaging support device according to any one of the first to twelfth aspects according to the disclosed technology, in which the processor is configured to perform image processing of rotating the captured image in a direction in which inclination of the captured image due to the inclination of the imaging apparatus is resolved, based on the information related to the inclination.

A fourteenth aspect according to the disclosed technology is the imaging support device according to any one of the first to thirteenth aspects according to the disclosed technology, in which the imaging apparatus includes an imaging element rotation mechanism that rotates an imaging element, and the processor is configured to rotate the imaging element in a direction in which inclination of the captured image due to the inclination of the imaging apparatus is resolved, by operating the imaging element rotation mechanism based on the information related to the inclination.

A fifteenth aspect according to the disclosed technology is the imaging support device according to any one of the first to fourteenth aspects according to the disclosed technology, in which the processor is configured to perform at least one of a control of displaying an image on which an adjustment result of the position of the captured image is reflected based on the information related to the inclination on a display portion, or a control of storing image data indicating the image on which the adjustment result is reflected in the memory.

A sixteenth aspect according to the disclosed technology is the imaging support device according to any one of the first to fifteenth aspects according to the disclosed technology, in which the processor is configured to perform at least one of a control of displaying an image on which an adjustment result of the position of the captured image is reflected based on the information related to the inclination on a display portion, or a control of storing image data indicating the image on which the adjustment result is reflected in a storage.

A seventeenth aspect according to the disclosed technology is an imaging apparatus comprising the imaging support device according to any one of the first to sixteenth aspects according to the disclosed technology, and an imaging element, in which the imaging element generates the captured image by performing imaging.

An eighteenth aspect according to the disclosed technology is an imaging system comprising the imaging support device according to any one of the first to sixteenth aspects according to the disclosed technology, and the imaging apparatus, in which the imaging apparatus generates the captured image by performing imaging.

A nineteenth aspect according to the disclosed technology is the imaging system according to the eighteenth aspect according to the disclosed technology, further comprising a revolution mechanism, in which the revolution mechanism causes the imaging apparatus to revolve about each of the first axis and the second axis as a central axis.

A twentieth aspect according to the disclosed technology is an imaging support method of supporting imaging performed by an imaging apparatus, the imaging support method comprising deriving information related to inclination of the imaging apparatus with respect to a revolution mechanism that enables the imaging apparatus to revolve about each of a first axis and a second axis intersecting with the first axis as a central axis, based on a time series change in revolution angle of the imaging apparatus, the inclination of the imaging apparatus being inclination in a rotation direction about a third axis intersecting with the first axis and the second axis as a central axis, and adjusting a position of a captured image obtained by imaging performed by the imaging apparatus based on the information related to the inclination.

A twenty-first aspect according to the disclosed technology is a program causing a computer to execute a process of supporting imaging performed by an imaging apparatus, the process comprising deriving information related to inclination of the imaging apparatus with respect to a revolution mechanism that enables the imaging apparatus to revolve about each of a first axis and a second axis intersecting with the first axis as a central axis, based on a time series change in revolution angle of the imaging apparatus, the inclination of the imaging apparatus being inclination in a rotation direction about a third axis intersecting with the first axis and the second axis as a central axis, and adjusting a position of a captured image obtained by imaging performed by the imaging apparatus based on the information related to the inclination.

BRIEF DESCRIPTION OF THE DRAWINGS

Exemplary embodiments of the technology of the disclosure will be described in detail based on the following figures, wherein.

DETAILED DESCRIPTION

An example of an embodiment according to the disclosed technology will be described in accordance with the appended drawings.

First, words used in the following description will be described.

CPU is an abbreviation for "Central Processing Unit". GPU is an abbreviation for "Graphics Processing Unit". ASIC is an abbreviation for "Application Specific Integrated Circuit". PLD is an abbreviation for "Programmable Logic Device". FPGA is an abbreviation for "Field-Programmable Gate Array". AFE is an abbreviation for "Analog Front End". DSP is an abbreviation for "Digital Signal Processor". SoC is an abbreviation for "System-on-a-Chip". SSD is an abbreviation for "Solid State Drive". USB is an abbreviation for "Universal Serial Bus". HDD is an abbreviation for "Hard Disk Drive". EEPROM is an abbreviation for "Electrically Erasable and Programmable Read Only Memory". EL is an abbreviation for "Electro-Luminescence". A/D is an abbreviation for "Analog/Digital". I/F is an abbreviation for "Interface". UI is an abbreviation for "User Interface". WAN is an abbreviation for "Wide Area Network". ISP is an abbreviation for "Image Signal Processor". CMOS is an abbreviation for "Complementary Metal Oxide Semiconductor". CCD is an abbreviation for "Charge Coupled Device". SWIR is an abbreviation for "Short-Wavelength InfraRed".

In the description of the present specification, "horizontal" refers to being horizontal in a sense of not only being completely horizontal but also including an error generally allowed in the technical field to which the disclosed technology belongs. In the description of the present specification, "parallel" refers to being parallel in a sense of not only being completely parallel but also including an error generally allowed in the technical field to which the disclosed technology belongs. In the description of the present specification, "perpendicular" refers to being perpendicular in a sense of not only being completely perpendicular but also including an error generally allowed in the technical field to which the disclosed technology belongs. In the description of the present specification, "coincidence" refers to coincidence in a sense of not only being completely coincident but also including an error generally allowed in the technical field to which the disclosed technology belongs.

First Embodiment

Figure 1:
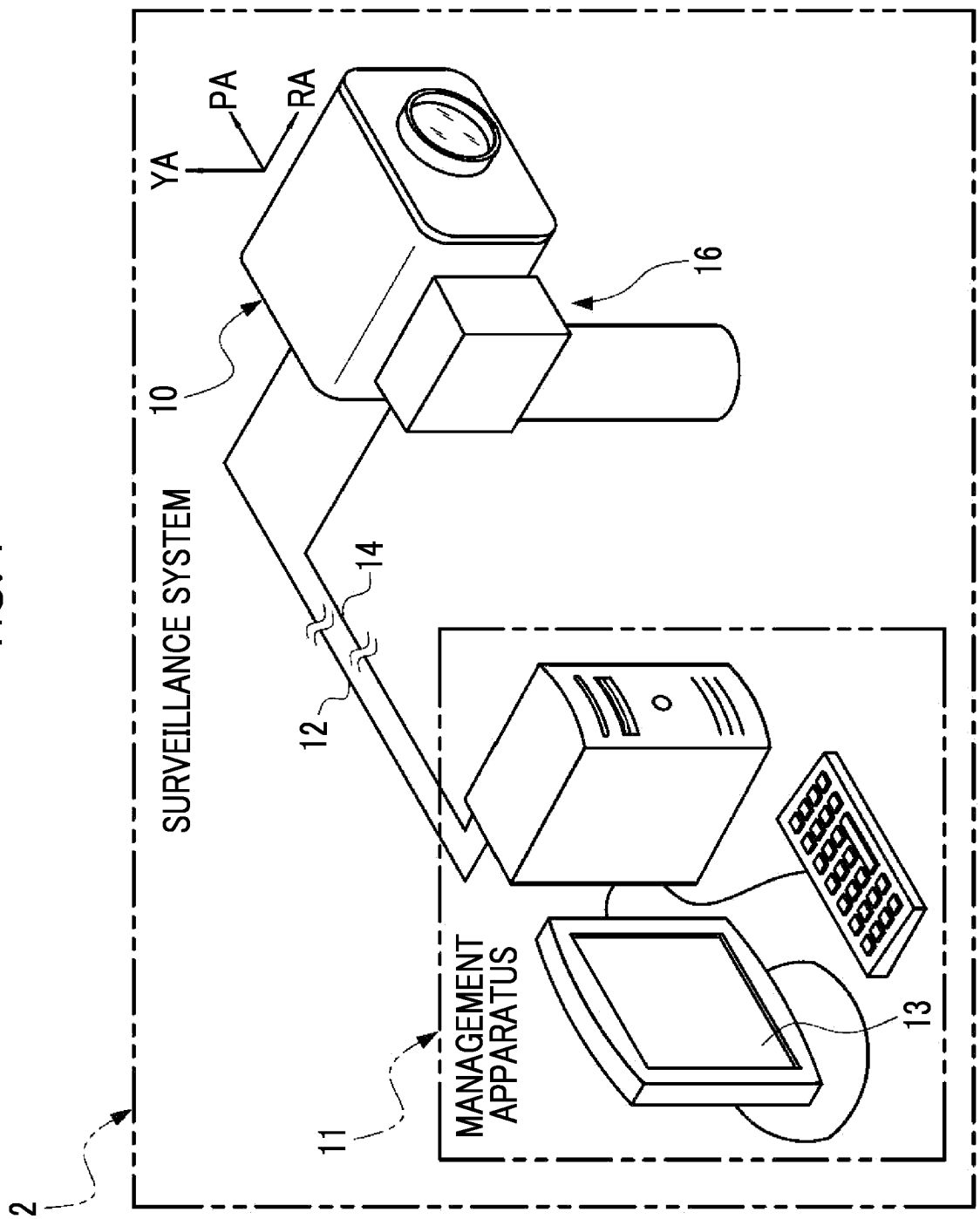
FIG. 1 is a schematic configuration diagram illustrating an example of a configuration of a surveillance system according to an embodiment.

As illustrated in FIG. 1 as an example, a surveillance system 2 comprises a surveillance camera 10 and a management apparatus 11. The surveillance system 2 is an example of an "imaging system" according to the embodiment of the disclosed technology. The surveillance camera 10 is an example of an "imaging apparatus" according to the embodiment of the disclosed technology.

The surveillance camera 10 is installed in an indoor or outdoor post or wall, a part (for example, a rooftop) of a building, or the like through a revolution mechanism 16, images a surveillance target that is a subject, and generates a motion picture image by the imaging. The motion picture image includes images of a plurality of frames obtained by imaging. The surveillance camera 10 transmits the motion picture image obtained by imaging to the management apparatus 11 through a communication line 12.

The management apparatus 11 comprises a display 13. The management apparatus 11 receives the motion picture image transmitted by the surveillance camera 10 and displays the received motion picture image on the display 13. Examples of the display 13 include a liquid crystal display or an organic EL display. The display 13 is an example of a "display portion (display)" according to the embodiment of the disclosed technology.

Figure 2:
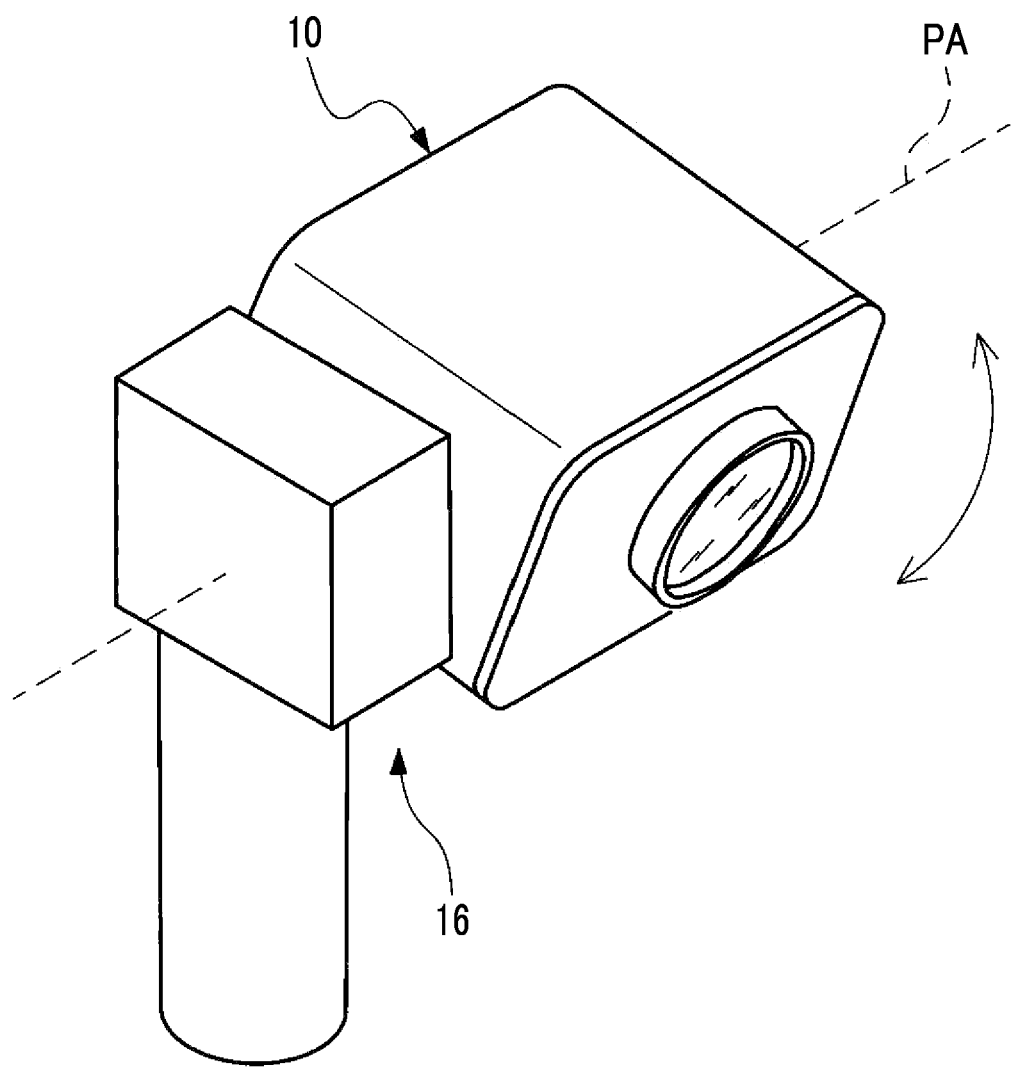
FIG. 2 is a perspective view illustrating an example of an exterior of a surveillance camera according to the embodiment.
Figure 3:
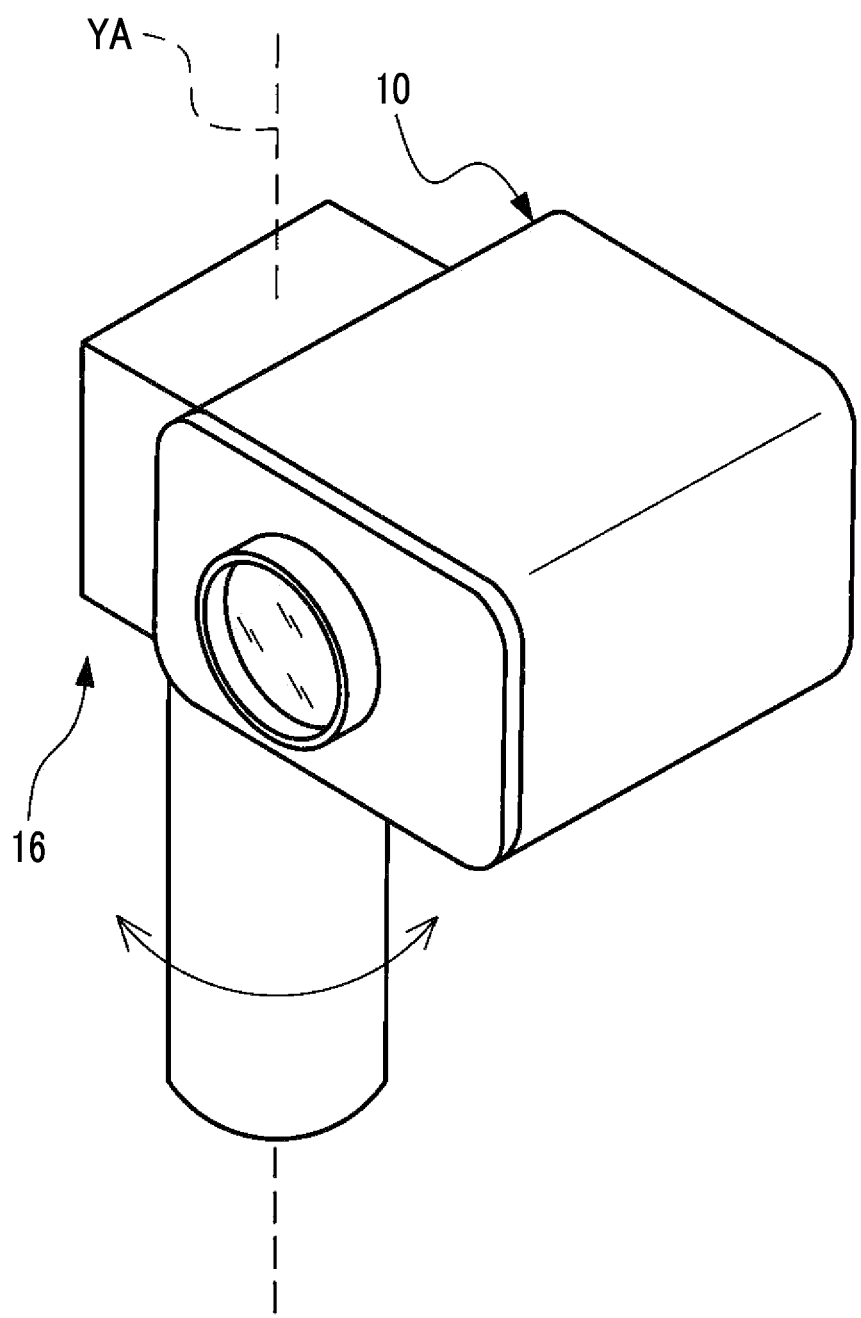
FIG. 3 is a perspective view illustrating an example of the exterior of the surveillance camera according to the embodiment.

The revolution mechanism 16 is attached to the surveillance camera 10. Driving of the revolution mechanism 16 is controlled by the management apparatus 11 through a control line 14. The revolution mechanism 16 enables the surveillance camera 10 to revolve. Specifically, the revolution mechanism 16 is a 2-axis revolution mechanism that enables the surveillance camera 10 to revolve about each of a first axis and a second axis intersecting with the first axis as a central axis. As illustrated in FIG. 2 as an example, the revolution mechanism 16 enables the surveillance camera 10 to revolve in a revolution direction of which a central axis is a pitch axis PA. In addition, as illustrated in FIG. 3 as an example, the revolution mechanism 16 enables the surveillance camera 10 to revolve in the revolution direction of which the central axis is a yaw axis YA. The revolution mechanism 16 is an example of a "revolution mechanism" according to the embodiment of the disclosed technology. In addition, the "pitch axis PA" is an example of a "first axis" according to the embodiment of the disclosed technology, and the "yaw axis YA" is an example of a "second axis" according to the embodiment of the disclosed technology.

Figure 4:
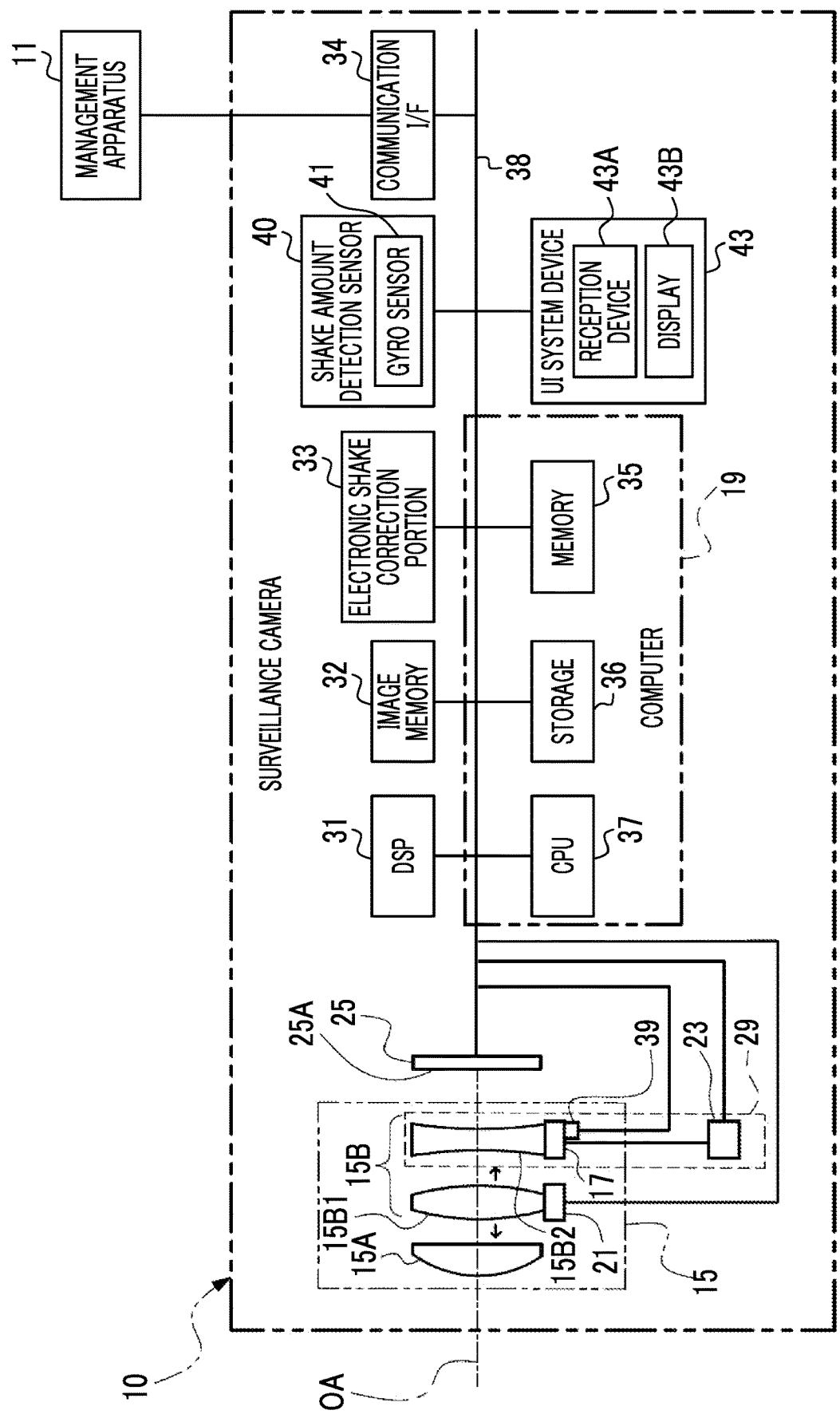
FIG. 4 is a block diagram illustrating an example of a configuration of an optical system and an electric system of the surveillance camera according to the embodiment.

As illustrated in FIG. 4 as an example, the surveillance camera 10 comprises an optical system 15 and an imaging element 25. The imaging element 25 is positioned on a rear stage of the optical system 15. The optical system 15 comprises an objective lens 15A and a lens group 15B. The objective lens 15A and the lens group 15B are arranged in an order of the objective lens 15A and the lens group 15B along an optical axis OA of the optical system 15 from the surveillance target side (object side) to a light-receiving surface 25A side (image side) of the imaging element 25. The lens group 15B includes a zoom lens 15B1 and the like.

The zoom lens 15B1 is movably supported along the optical axis OA by a moving mechanism 21. The moving mechanism 21 moves the zoom lens 15B1 along the optical axis OA in accordance with motive power provided from a motor (not illustrated) for the zoom lens. In addition, the lens group 15B includes an anti-vibration lens 15B2. The anti-vibration lens 15B2 changes in a direction perpendicular to the optical axis OA in accordance with motive power provided from an actuator 17, described later. By the optical system 15 configured in such a manner, an image of surveillance target light showing the surveillance target is formed on the light-receiving surface 25A. The imaging element 25 is an example of an "imaging element" according to the embodiment of the disclosed technology.

Examples of a vibration exerted on the surveillance camera 10 include, in a case of an outdoor space, a vibration caused by traffic of an automobile, a vibration caused by wind, a vibration caused by construction work, and the like and, in a case of an indoor space, a vibration caused by an operation of an air conditioner, a vibration caused by entrance and exit of a person, and the like. In addition, examples of the vibration exerted on the surveillance camera 10 include a vibration during revolution of the surveillance camera 10 by the revolution mechanism 16, a vibration in a case where a revolution operation performed by the revolution mechanism 16 is started or stopped, and the like. Thus, in the surveillance camera 10, a shake occurs due to the vibration exerted on the surveillance camera 10 (hereinafter, simply referred to as the "vibration").

In the present embodiment, the "shake" refers to a phenomenon in which a subject image on the light-receiving surface 25A changes due to a change in positional relationship between the optical axis OA and the light-receiving surface 25A in the surveillance camera 10. In other words, the "shake" is said to be a phenomenon in which an optical image obtained by forming the image on the light-receiving surface 25A changes by inclination of the optical axis OA due to the vibration exerted on the surveillance camera 10. For example, changing of the optical axis OA means inclination of the optical axis OA with respect to a reference axis (for example, the optical axis OA before the shake occurs). Hereinafter, the shake that occurs due to the vibration will be simply referred to as the "shake".

Therefore, the surveillance camera 10 includes a mechanical shake correction portion 29 and an electronic shake correction portion 33. The mechanical shake correction portion 29 and the electronic shake correction portion 33 correct the shake occurring due to the vibration exerted on the surveillance camera 10. The mechanical shake correction portion 29 is a mechanism that corrects the shake by applying motive power generated by a driving source such as a motor (for example, a voice coil motor) to the anti-vibration lens to move the anti-vibration lens in a direction perpendicular to an optical axis of an imaging optical system. The electronic shake correction portion 33 corrects the shake by performing image processing on a captured image based on a shake amount. That is, a shake correction portion (shake correction component) such as the mechanical shake correction portion 29 and the electronic shake correction portion 33 mechanically or electronically corrects the shake using a hardware configuration and/or a software configuration. Here, mechanical correction of the shake refers to correction of the shake implemented by mechanically moving a shake correction element such as an anti-vibration lens and/or an imaging element using motive power generated by a driving source such as a motor (for example, a voice coil motor). Electronic correction of the shake refers to correction of the shake implemented by performing the image processing by a processor. In the present embodiment, "correction of the shake" includes a meaning of removing the shake and also a meaning of reducing the shake.

The mechanical shake correction portion 29 comprises the anti-vibration lens 15B2, the actuator 17, a driver 23, and a position detection sensor 39.

Various well-known methods can be employed as a method of correcting the shake by the mechanical shake correction portion 29. In the present embodiment, a method of moving the anti-vibration lens 15B2 based on the shake amount detected by a shake amount detection sensor 40 (described later) is employed as the method of correcting the shake. Specifically, the shake is corrected by moving the anti-vibration lens 15B2 in a direction of canceling the shake by an amount with which the shake is canceled.

The actuator 17 is attached to the anti-vibration lens 15B2. The actuator 17 is a shift mechanism in which a voice coil motor is mounted, and changes the anti-vibration lens 15B2 in the direction perpendicular to the optical axis OA by driving the voice coil motor. Here, while the shift mechanism in which the voice coil motor is mounted is employed as the actuator 17, the disclosed technology is not limited thereto. Other motive power sources such as a stepping motor or a piezo element may be applied instead of the voice coil motor.

Driving of the actuator 17 is controlled by the driver 23. Driving the actuator 17 under control of the driver 23 mechanically changes a position of the anti-vibration lens 15B2 with respect to the optical axis OA.

The position detection sensor 39 detects the current position of the anti-vibration lens 15B2 and outputs a position signal indicating the detected current position. Here, a device including a hall element is employed as an example of the position detection sensor 39. Here, the current position of the anti-vibration lens 15B2 refers to the current position in a two-dimensional plane of the anti-vibration lens 15B2 (hereinafter, referred to as an anti-vibration lens two-dimensional plane). The anti-vibration lens two-dimensional plane refers to a two-dimensional plane perpendicular to the optical axis OA. In the present embodiment, while the device including the hall element is employed as an example of the position detection sensor 39, the disclosed technology is not limited thereto. A magnetic sensor, a photosensor, or the like may be employed instead of the hall element.

The surveillance camera 10 comprises a computer 19, a DSP 31, an image memory 32, the electronic shake correction portion 33, a communication I/F 34, the shake amount detection sensor 40, and a UI system device 43. The computer 19 comprises a memory 35, a storage 36, and a CPU 37. The CPU 37 is an example of a "processor" according to the embodiment of the disclosed technology. In addition, the memory 35 is an example of a "memory" according to the embodiment of the disclosed technology.

The imaging element 25, the DSP 31, the image memory 32, the electronic shake correction portion 33, the communication I/F 34, the memory 35, the storage 36, the CPU 37, the shake amount detection sensor 40, and the UI system device 43 are connected to a bus 38. In addition, the driver 23 is connected to the bus 38. In the example illustrated in FIG. 4, while one bus is illustrated as the bus 38 for convenience of illustration, a plurality of buses may be used. The bus 38 may be a serial bus or may be a parallel bus including a data bus, an address bus, a control bus, and the like.

The memory 35 temporarily stores various information and is used as a work memory. Examples of the memory 35 include a RAM. However, the disclosed technology is not limited thereto. A storage device of other types may be used. The storage 36 is a non-volatile storage device. Here, a flash memory is employed as an example of the storage 36. The flash memory is merely an example. Various non-volatile memories such as a magnetoresistive memory and/or a ferroelectric memory can be used instead of the flash memory or together with the flash memory as the storage 36. In addition, the non-volatile storage device may be an EEPROM, an HDD, and/or an SSD or the like. The storage 36 stores various programs for the surveillance camera 10. The CPU 37 controls the entire surveillance camera 10 by reading out various programs from the storage 36 and executing the read various programs on the memory 35.

The imaging element 25 is a CMOS image sensor. The imaging element 25 images the surveillance target at a predetermined frame rate under an instruction of the CPU 37. Here, for example, the "predetermined frame rate" refers to a few tens of frames/second to a few hundred frames/second. The imaging element 25 may incorporate a control device (imaging element control device). In this case, the imaging element control device performs detailed controls inside imaging element 25 in accordance with an imaging instruction provided by the CPU 37. In addition, the imaging element 25 may image a target subject at the predetermined frame rate under an instruction of the DSP 31. In this case, the imaging element control device performs the detailed controls inside the imaging element 25 in accordance with the imaging instruction output by the DSP 31. The DSP 31 may be referred to as an ISP.

The light-receiving surface 25A of the imaging element 25 is formed with a plurality of photosensitive pixels (not illustrated) arranged in a matrix. In the imaging element 25, photoelectric conversion is performed for each photosensitive pixel by exposing each photosensitive pixel.

Charges obtained by performing the photoelectric conversion for each photosensitive pixel correspond to an analog imaging signal indicating the target subject. Here, a plurality of photoelectric conversion elements (for example, photoelectric conversion elements in which infrared light transmissive filters are arranged) having sensitivity to infrared light are employed as the plurality of photosensitive pixels.

In the surveillance camera 10, imaging based on the infrared light (for example, light on a long wavelength side of approximately 700 nanometers) is performed using the photoelectric conversion elements having sensitivity to the infrared light. Particularly, for imaging for SWIR, for example, an InGaAs sensor and/or a type-2 quantum well (T2SL; Simulation of Type-II Quantum Well) sensor may be used as the imaging element 25 instead of the CMOS image sensor. However, the present embodiment is not limited thereto. Imaging based on visible light (for example, light on a short wavelength side of less than or equal to approximately 700 nanometers) may be performed using photoelectric conversion elements having sensitivity to the visible light. Alternatively, photoelectric conversion elements having sensitivity to both of the visible light and the infrared light may be used. Alternatively, an incidence ray transmitted through the optical system 15 may be separated into the visible light and the infrared light by a filter, a dichroic prism, or the like, and photoelectric conversion elements having sensitivity to each light may be used.

The imaging element 25 generates a digital image that is configured with a digital imaging signal by performing signal processing such as A/D conversion on the analog imaging signal. The imaging element 25 is connected to the DSP 31 through the bus 38 and outputs the generated digital image to the DSP 31 in units of frames through the bus 38. Here, the digital image is an example of a "captured image" according to the embodiment of the disclosed technology.

Here, while the CMOS image sensor is illustratively described as an example of the imaging element 25, the disclosed technology is not limited thereto. A CCD image sensor may be applied as the imaging element 25. In this case, the imaging element 25 is connected to the bus 38 through an AFE (not illustrated) that incorporates a CCD driver. The AFE generates the digital image by performing the signal processing such as the A/D conversion on the analog imaging signal obtained by the imaging element 25 and outputs the generated digital image to the DSP 31. The CCD image sensor is driven by the CCD driver incorporated in the AFE. The CCD driver may be independently provided.

The DSP 31 performs various digital signal processing on the digital image. For example, the various digital signal processing refers to demosaicing, noise removal processing, gradation correction processing, and color correction processing.

The DSP 31 outputs the digital image after the digital signal processing to the image memory 32 for each frame. The image memory 32 stores the digital image from the DSP 31. Hereinafter, for convenience of description, the digital image stored in the image memory 32 will be referred to as the "captured image".

The shake amount detection sensor 40 is, for example, a device including a gyro sensor 41 and detects the shake amount of the surveillance camera 10. The shake amount detection sensor 40 detects the shake amount for each of a pair of axial directions. The gyro sensor 41 detects an amount of a rotational shake about each axis (refer to FIG. 1) of the pitch axis PA and the yaw axis YA. The shake amount detection sensor 40 detects the shake amount of the surveillance camera 10 by converting the amount of the rotational shake about the pitch axis PA and the amount of the rotational shake about the yaw axis YA detected by the gyro sensor 41 into a shake amount in a two-dimensional plane parallel to the pitch axis PA and the yaw axis YA. The shake amount detection sensor 40 outputs the detected shake amount to the CPU 37. Here, the gyro sensor 41 is an example of a "sensor" and a "gyro sensor" according to the embodiment of the disclosed technology.

Here, while the gyro sensor 41 is illustrated as an example of the shake amount detection sensor 40, this is merely an example. The shake amount detection sensor 40 may be an acceleration sensor. The acceleration sensor detects the shake amount in the two-dimensional plane parallel to the pitch axis PA and the yaw axis YA.

In addition, here, while an example of a form of detecting the shake amount by the shake amount detection sensor 40 that is a physical sensor is illustrated, the disclosed technology is not limited thereto. For example, a movement vector obtained by comparing captured images that are stored in the image memory 32 and are adjacent to each other in time series may be used as the shake amount. In addition, a finally used shake amount may be derived based on the shake amount detected by the physical sensor and the movement vector obtained by the image processing.

The CPU 37 acquires the shake amount detected by the shake amount detection sensor 40 and controls the mechanical shake correction portion 29 and the electronic shake correction portion 33 based on the acquired shake amount. The shake amount detected by the shake amount detection sensor 40 is used for correction of the shake by each of the mechanical shake correction portion 29 and the electronic shake correction portion 33.

The electronic shake correction portion 33 is a device including an ASIC. The electronic shake correction portion 33 corrects the shake by performing the image processing on the captured image in the image memory 32 based on the shake amount detected by the shake amount detection sensor 40. The mechanical shake correction portion 29 and the electronic shake correction portion 33 correct the shake in accordance with the shake amount detected by the shake amount detection sensor 40.

Here, while the device including the ASIC is illustrated as the electronic shake correction portion 33, the disclosed technology is not limited thereto. For example, a device including an FPGA or a PLD may be used. In addition, for example, the electronic shake correction portion 33 may be a device including a plurality out of the ASIC, the FPGA, and the PLD. In addition, a computer including a CPU, a storage, and a memory may be employed as the electronic shake correction portion 33. The number of CPUs may be singular or plural. In addition, the electronic shake correction portion 33 may be implemented by a combination of a hardware configuration and a software configuration.

The communication I/F 34 is, for example, a network interface and controls transfer of various information with respect to the management apparatus 11 through a network. Examples of the network include a WAN such as the Internet or a public communication network. The communication I/F 34 controls communication between the surveillance camera 10 and the management apparatus 11.

The UI system device 43 comprises a reception device 43A and a display 43B. For example, the reception device 43A includes a hard key and a touch panel and receives various instructions from a user of the surveillance system 2 (hereinafter, simply referred to as the "user"). The CPU 37 acquires the various instructions received by the reception device 43A and operates in accordance with the acquired instructions.

The display 43B displays various information under control of the CPU 37. Examples of the various information displayed on the display 43B include contents of the various instructions received by the reception device 43A and the captured image.

Figure 5:
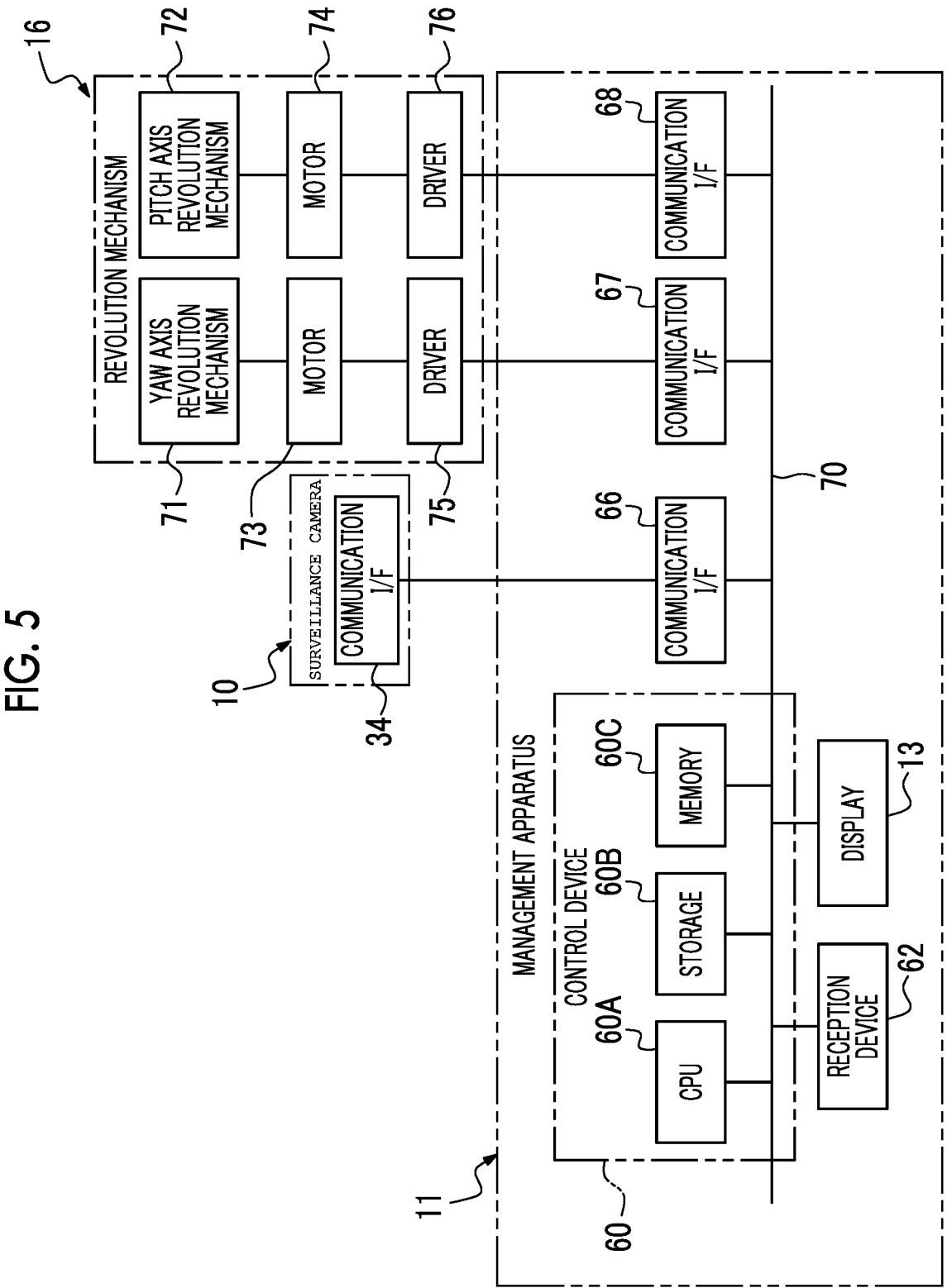
FIG. 5 is a block diagram illustrating an example of a configuration of an electric system of a management apparatus and a revolution mechanism according to the embodiment.

As illustrated in FIG. 5 as an example, the management apparatus 11 comprises the display 13, a control device 60, a reception device 62, and communication I/Fs 66 to 68. The control device 60 comprises a CPU 60A, a storage 60B, and a memory 60C. Each of the reception device 62, the display 13, the CPU 60A, the storage 60B, the memory 60C, and the communication I/Fs 66 to 68 is connected to a bus 70. In the example illustrated in FIG. 5, while one bus is illustrated as the bus 70 for convenience of illustration, a plurality of buses may be used. The bus 70 may be a serial bus or may be a parallel bus including a data bus, an address bus, a control bus, and the like.

The memory 60C temporarily stores various information and is used as a work memory. Examples of the memory 60C include a RAM. However, the disclosed technology is not limited thereto. A storage device of other types may be used. The storage 60B is a non-volatile storage device. Here, a flash memory is employed as an example of the storage 60B. The flash memory is merely an example. Various non-volatile memories such as a magnetoresistive memory and/or a ferroelectric memory are used instead of the flash memory or together with the flash memory as the storage 60B. In addition, the non-volatile storage device may be an EEPROM, an HDD, and/or an SSD or the like. The storage 60B stores various programs for the management apparatus 11 (hereinafter, simply referred to as a "management apparatus program"). The CPU 60A controls the entire management apparatus 11 by reading out the management apparatus program from the storage 60B and executing the read management apparatus program on the memory 60C. In addition, the storage 60B stores the received motion picture image. The storage 60B is an example of a "storage" according to the embodiment of the disclosed technology.

The communication I/F 66 is, for example, a network interface. The communication I/F 66 is communicably connected to the communication I/F 34 of the surveillance camera 10 through a network and controls transfer of various information with respect to the surveillance camera 10. For example, the communication I/F 66 requests the surveillance camera 10 to transmit the captured image and receives the captured image transmitted from the communication I/F 34 of the surveillance camera 10 in response to the request for transmission of the captured image.

The revolution mechanism 16 comprises a yaw axis revolution mechanism 71, a pitch axis revolution mechanism 72, a motor 73, a motor 74, a driver 75, and a driver 76. The motor 73 is driven to generate motive power under control of the driver 75. The yaw axis revolution mechanism 71 causes the surveillance camera 10 to revolve about the yaw axis YA by receiving the motive power generated by the motor 73. The motor 74 is driven to generate motive power under control of the driver 76. The pitch axis revolution mechanism 72 causes the surveillance camera 10 to revolve about the pitch axis PA by receiving the motive power generated by the motor 74.

The communication I/Fs 67 and 68 are, for example, network interfaces. The communication I/F 67 is communicably connected to the driver 75 through a network. The CPU 60A controls a revolution operation of the yaw axis revolution mechanism 71 by controlling the motor 73 through the communication I/F 67 and the driver 75. The communication I/F 68 is communicably connected to the driver 76 through a network. The CPU 60A controls a revolution operation of the pitch axis revolution mechanism 72 by controlling the motor 74 through the communication I/F 68 and the driver 76.

The reception device 62 includes, for example, a keyboard, a mouse, and a touch panel and receives various instructions from the user. The CPU 60A acquires the various instructions received by the reception device 62 and operates in accordance with the acquired instructions.

The display 13 displays various information under control of the CPU 60A. Examples of the various information displayed on the display 13 include contents of the various instructions received by the reception device 62 and the captured image received by the communication I/F 66.

The storage 60B stores various information under control of the CPU 60A. Examples of the various information stored in the storage 60B include the captured image received by the communication I/F 66.

In such a manner, the control device 60 performs a control of displaying the captured image received by the communication I/F 66 on the display 13 and a control of storing the captured image received by the communication I/F 66 in the storage 60B. The captured image displayed on the display 13 is an example of an "image on which an adjustment result is reflected" according to the embodiment of the disclosed technology. In addition, the captured image stored in the storage 60B is an example of "image data" according to the embodiment of the disclosed technology.

Here, while the captured image is displayed on the display 13, and the captured image received by the communication I/F 66 is stored in the storage 60B, the disclosed technology is not limited thereto. For example, any of the display of the captured image on the display 13 and the storage of the captured image in the storage 60B may be performed. In addition, the control device 60 may temporarily store the captured image received by the communication I/F 66 in the memory 60C.

Figure 6:
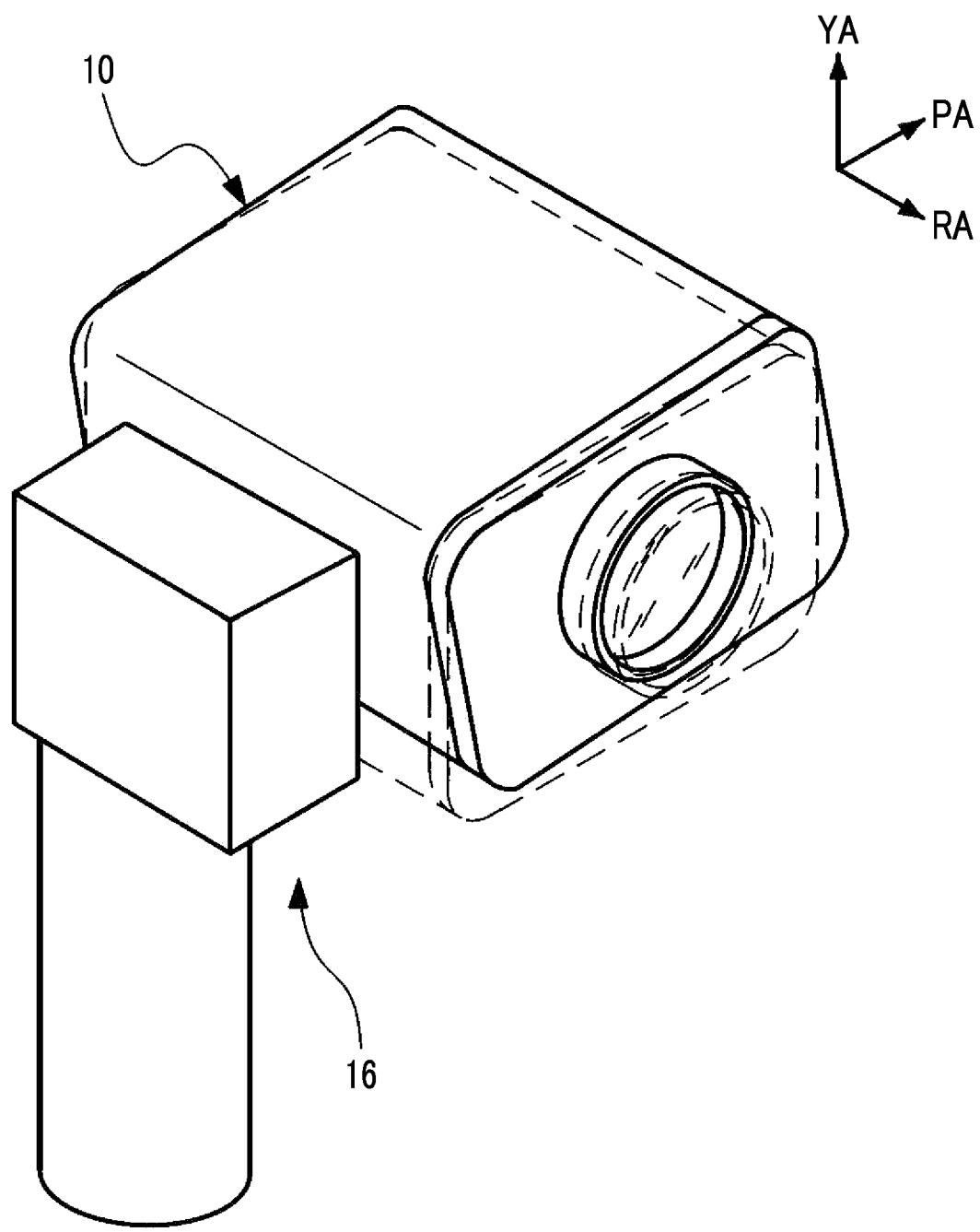
FIG. 6 is a conceptual diagram for describing inclination occurring at a time of attachment in the surveillance camera according to the embodiment.
Figure 7:
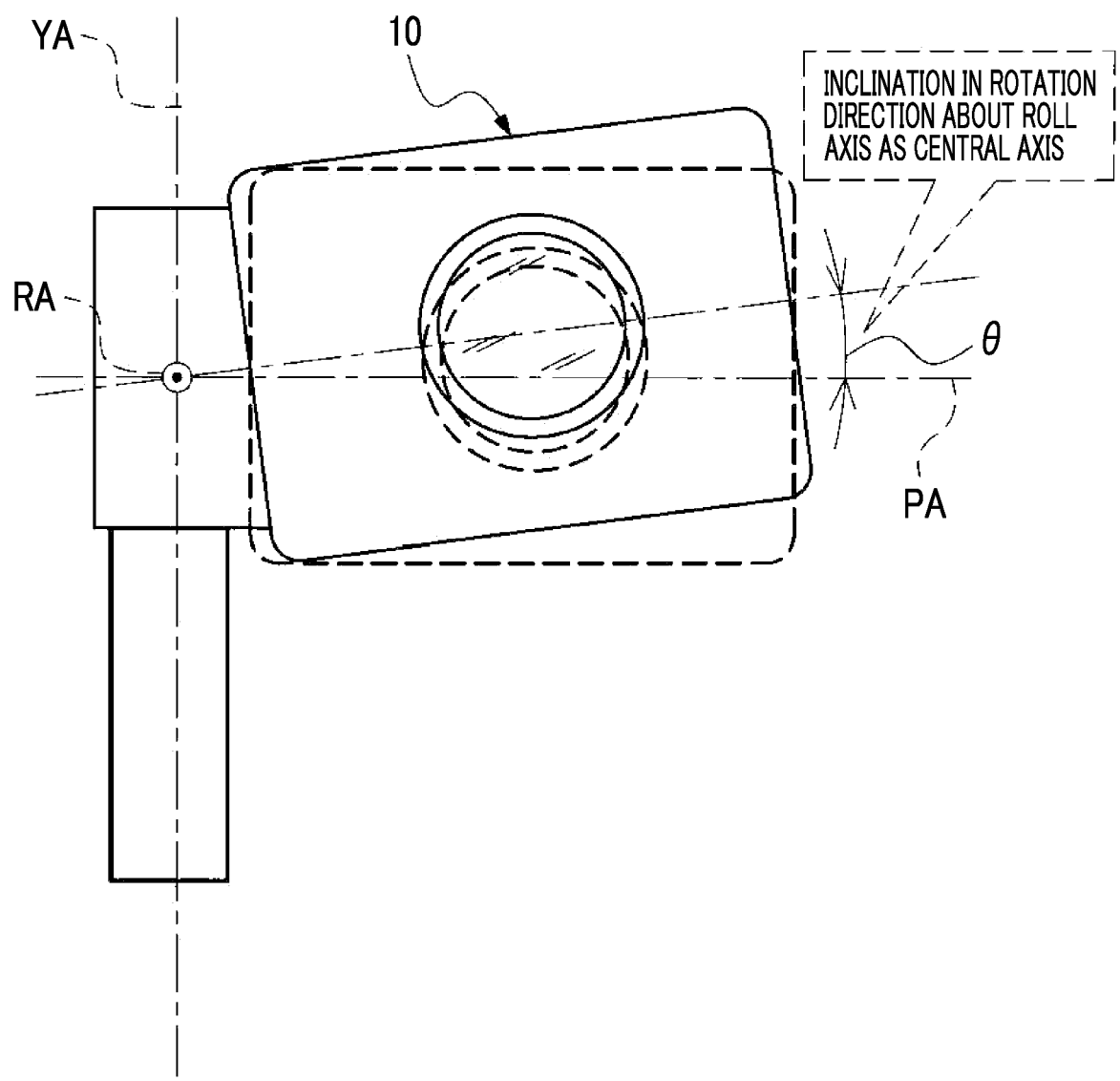
FIG. 7 is a conceptual diagram for describing the inclination occurring at the time of attachment in the surveillance camera according to the embodiment.

In a case where the surveillance camera 10 is assembled to the revolution mechanism 16, as illustrated in FIG. 6 and FIG. 7 as an example, the surveillance camera 10 may be assembled to the revolution mechanism 16 in an inclined state due to a cause such as accuracy of an assembly work or dimensional accuracy of the surveillance camera 10 or the revolution mechanism 16. Specifically, the surveillance camera 10 may be attached to the revolution mechanism 16 in an inclined state by an angle θ in a rotation direction about a roll axis RA intersecting with the yaw axis YA and the pitch axis PA as a central axis. Here, the angle θ of the inclination is an angle of inclination of the surveillance camera 10 with respect to the central axis of the revolution by the revolution mechanism 16. In the following description, the angle θ of inclination of the surveillance camera 10 will be simply referred to as an "inclination angle". The roll axis RA is an example of a "third axis" according to the embodiment of the disclosed technology. In FIG. 6 and FIG. 7, the surveillance camera 10 that is assembled to the revolution mechanism 16 in a non-inclined state is illustrated by a broken line in order to be distinguished from the surveillance camera 10 that is assembled to the revolution mechanism 16 in the inclined state and is illustrated by a solid line. The same applies to subsequent FIG. 8 and FIG. 9.

Figure 8:
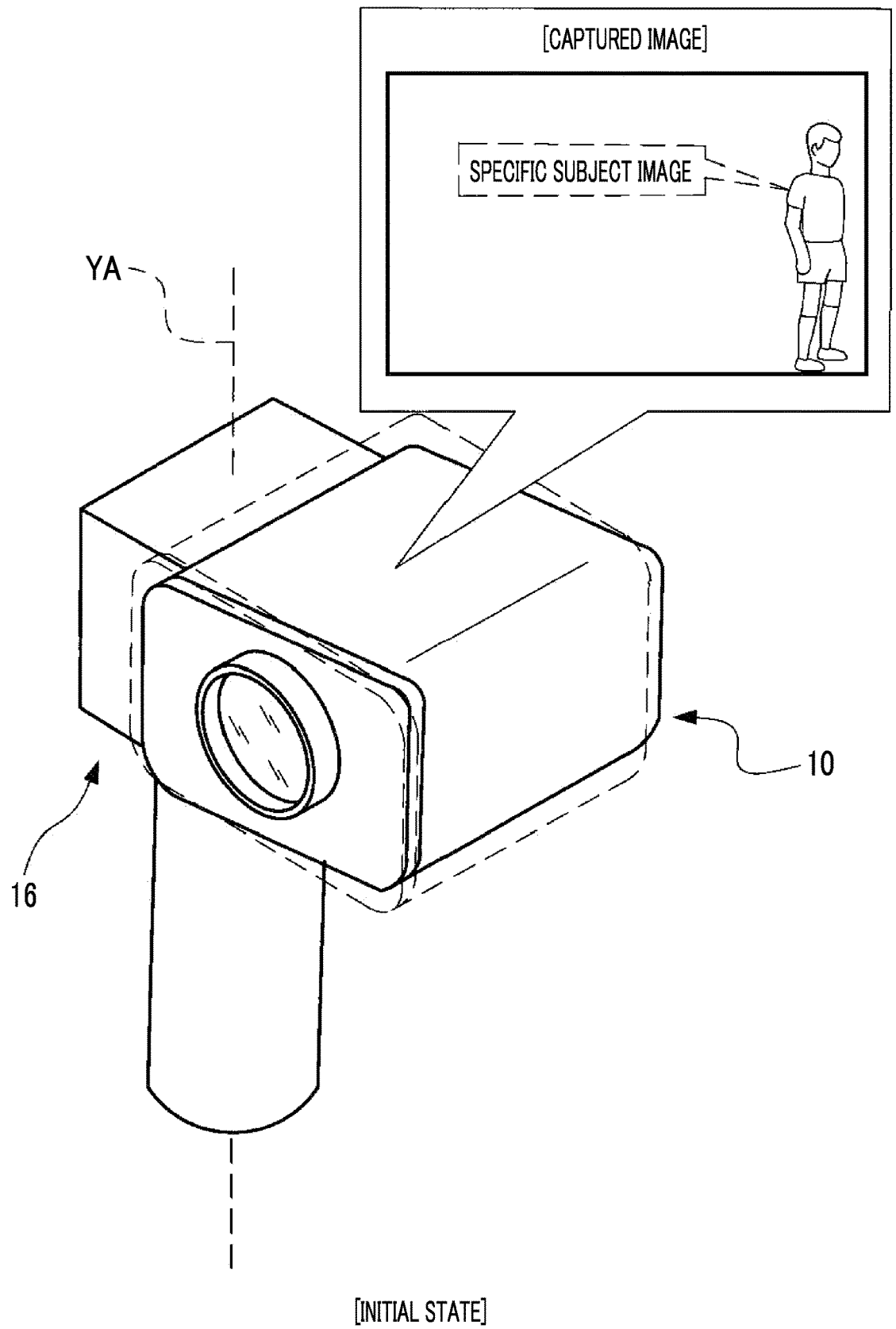
FIG. 8 is a conceptual diagram for describing misregistration occurring in the surveillance camera according to the embodiment.
Figure 9:
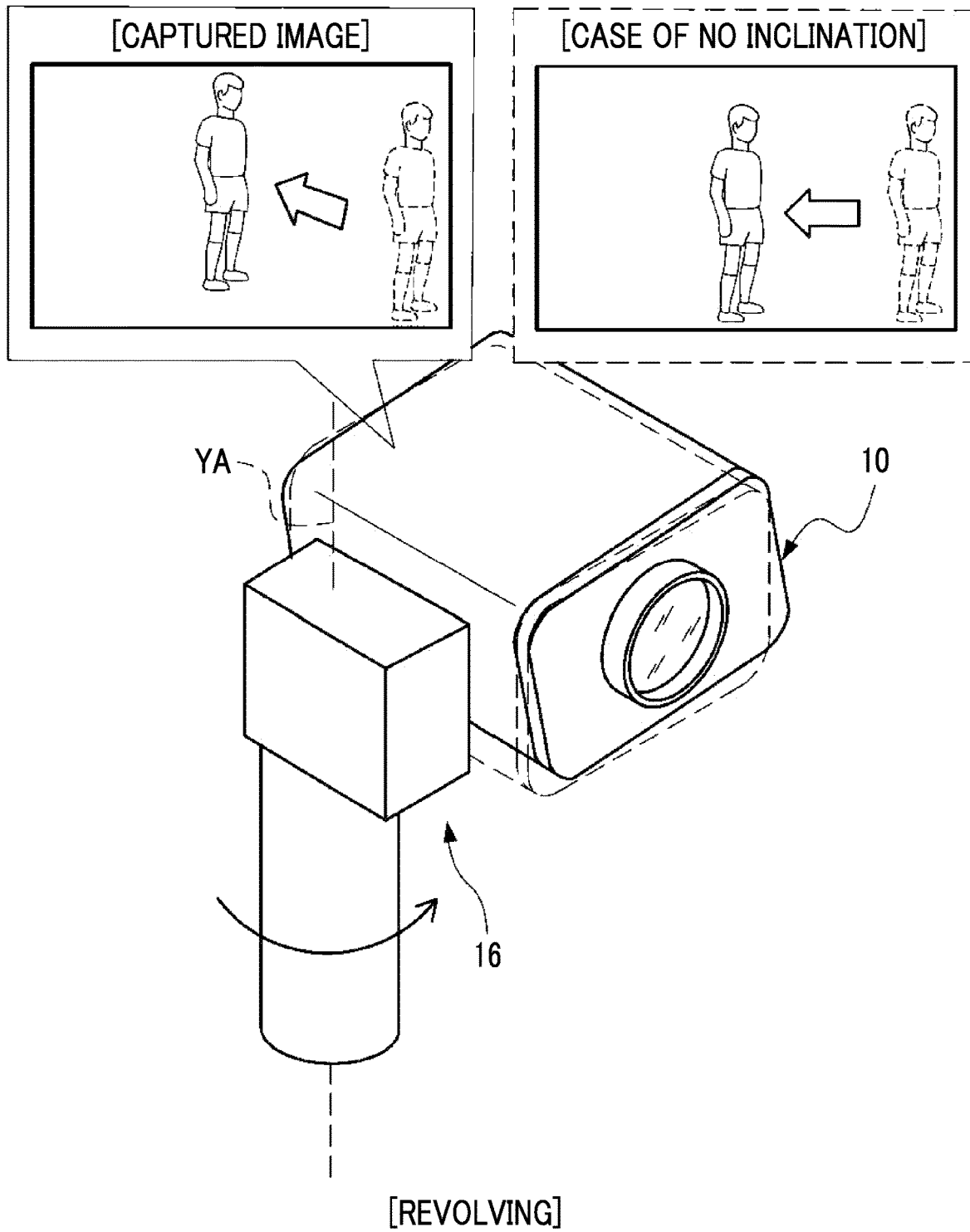
FIG. 9 is a conceptual diagram for describing the misregistration occurring in the surveillance camera according to the embodiment.

In such a manner, in a case where the surveillance camera 10 is attached to the revolution mechanism 16 in an inclined manner, imaging of a specific subject (as an example, a person or an object) by the surveillance camera 10 may be affected. That is, as illustrated in FIG. 8 as an example, in an initial state where the imaging of the specific subject by the surveillance camera 10 is started, a specific subject image is positioned at a right end of the captured image as illustrated within a solid line balloon. Then, as illustrated in FIG. 9 as an example, the revolution mechanism 16 causes the surveillance camera 10 to revolve by revolving about the yaw axis YA as a central axis. At this point, an imaging range changes in accordance with the revolution of the surveillance camera 10. Consequently, a position of the specific subject image moves in the captured image. Here, in a case where the surveillance camera 10 is attached to the revolution mechanism 16 without inclination, and the surveillance camera 10 is caused to revolve about the yaw axis YA as a central axis by the revolution mechanism 16, the position of the specific subject image moves in a horizontal direction in the captured image as illustrated in a broken line balloon on a right side of FIG. 9 and, for example, moves to a center in the captured image.

However, in a case where the surveillance camera 10 is attached to the revolution mechanism 16 in the inclined state, the position of the specific subject image moves in not only the horizontal direction but also an up-down direction in the captured image as illustrated in a solid line balloon on a left side of FIG. 9. That is, the position of the specific subject image moves in an oblique direction in the captured image regardless of the revolution about only the yaw axis YA as a central axis by the revolution mechanism 16. Consequently, it may be difficult to perform imaging by the surveillance camera 10. Particularly, in a case where the surveillance camera 10 has a tracking function for the specific subject, it is difficult to follow the movement of the specific subject using the revolution by the revolution mechanism 16. That is, even in a case of trying to follow the movement of the specific subject using the revolution by the revolution mechanism 16, the position of the specific subject image moves in the captured image in a direction not intended by the user due to misregistration of the captured image caused by the inclination in the rotation direction of the surveillance camera 10 about the roll axis RA as a central axis with respect to the revolution mechanism 16. Thus, it may be difficult to perform imaging by the surveillance camera 10, and an effect may be particularly noticeable in a case of performing imaging while tracking the specific subject.

Figure 10:
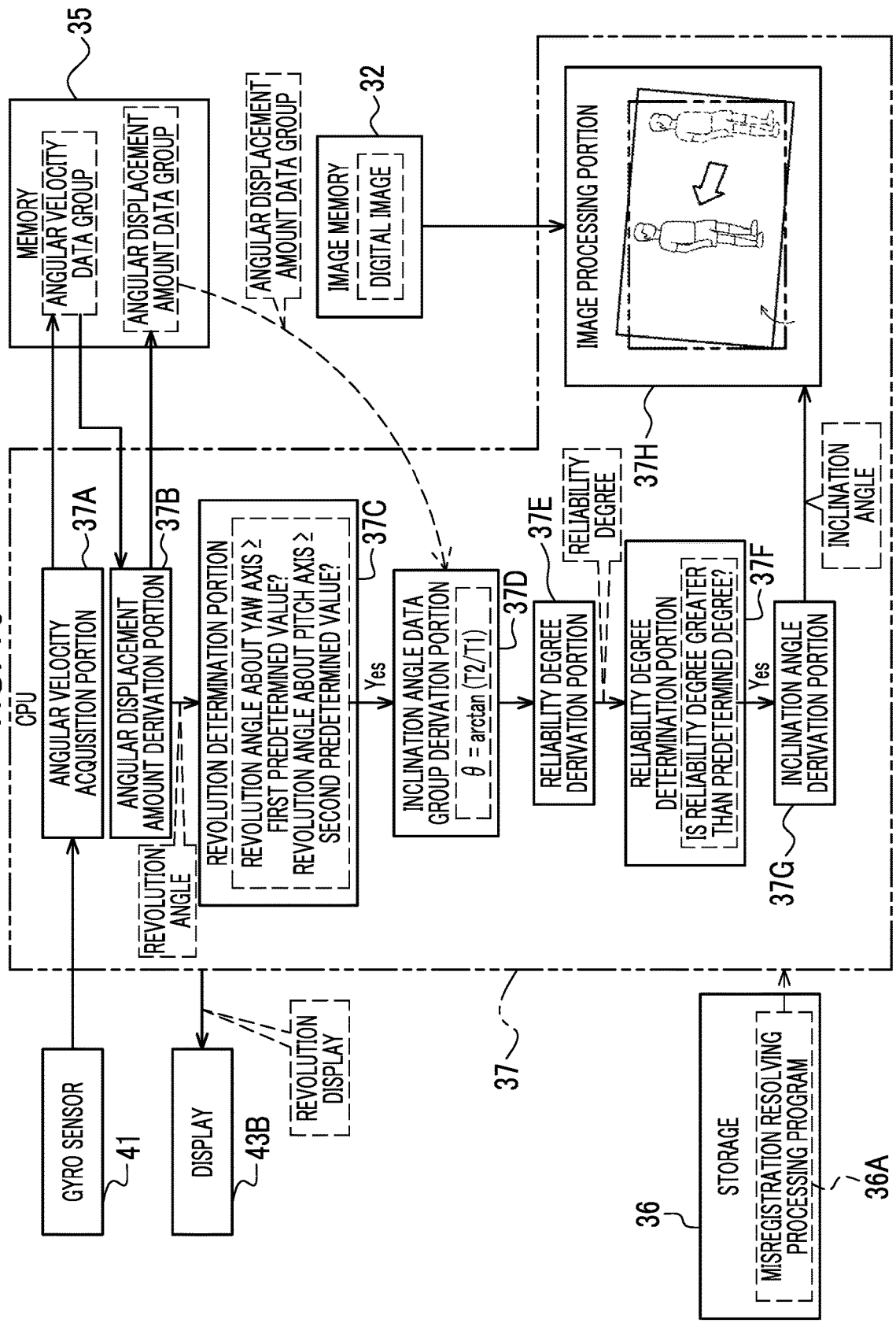
FIG. 10 is a function block diagram illustrating an example of functions of a CPU included in the surveillance camera according to the embodiment.

Therefore, in order to resolve the misregistration of the captured image when the surveillance camera 10 is attached to the revolution mechanism 16 in an inclined manner, the storage 36 stores a misregistration resolving processing program 36A as illustrated in FIG. 10 as an example. The misregistration resolving processing program 36A is executed by the CPU 37. Specifically, the CPU 37 reads out the misregistration resolving processing program 36A from the storage 36. Furthermore, the CPU 37 functions as a processor of an imaging support device that supports imaging performed by the surveillance camera 10 including the imaging element 25, by executing the read misregistration resolving processing program 36A on the memory 35. In such a manner, by functioning as the processor of the imaging support device, the CPU 37 supports imaging under a state where the surveillance camera 10 is attached to the revolution mechanism 16 in the inclined state.

The CPU 37 operates as an angular velocity acquisition portion 37A, an angular displacement amount derivation portion 37B, a revolution determination portion 37C, an inclination angle data group derivation portion 37D, a reliability degree derivation portion 37E, a reliability degree determination portion 37F, an inclination angle derivation portion 37Q and an image processing portion 37H. In addition, in deriving the angle θ of the inclination for resolving the misregistration, the CPU 37 performs display for instructing the user to perform the revolution operation on the display 43B. In the following description, a case where the user performs the revolution of the revolution mechanism 16 about only the yaw axis YA as a central axis in the derivation of the angle θ of the inclination by the CPU 37 will be described.

The angular velocity acquisition portion 37A acquires an output from the gyro sensor 41. Specifically, while the revolution by the revolution mechanism 16 by the user is performed, the angular velocity acquisition portion 37A sequentially acquires an angular velocity output from the gyro sensor 41 at a predetermined time interval (in the following description, referred to as a sampling rate). As an example, the angular velocity acquisition portion 37A acquires the angular velocity in the revolution direction about the yaw axis YA as a central axis and an angular velocity in the revolution direction about the pitch axis PA as a central axis in a state where the surveillance camera 10 is revolving about the yaw axis YA as a central axis by the revolution mechanism 16. Furthermore, the angular velocity acquisition portion 37A acquires the angular velocity in a state where the surveillance camera 10 is revolving in one direction of the revolution direction about the yaw axis YA as a central axis. The angular velocity acquisition portion 37A stores the angular velocity sequentially acquired in accordance with the sampling rate of the gyro sensor 41 in the memory 35 as an angular velocity data group.

The angular displacement amount derivation portion 37B acquires the angular velocity data group stored in the memory 35 and derives an angular displacement amount from the angular velocity data group. Specifically, the angular displacement amount derivation portion 37B derives the angular displacement amount about each of the yaw axis YA and the pitch axis PA by integrating a change in angular velocity about the yaw axis YA and the pitch axis PA with respect to time. The angular displacement amount derivation portion 37B derives a revolution angle of the revolution mechanism 16 from the angular displacement amount. The angular displacement amount derivation portion 37B outputs the derived revolution angle to the revolution determination portion 37C. Furthermore, the angular displacement amount derivation portion 37B stores the derived angular displacement amount in the memory 35 as an angular displacement amount data group. The angular displacement amount data group is an example of a "time series change in revolution angle" according to the embodiment of the disclosed technology.

The revolution determination portion 37C determines whether or not the revolution angle of the revolution mechanism 16 is greater than or equal to a predetermined value. Specifically, the revolution determination portion 37C determines whether or not an amount of change in revolution angle about the yaw axis YA as a central axis is greater than or equal to a first predetermined value, and an amount of change in revolution angle about the pitch axis PA as a central axis is greater than or equal to a second predetermined value. By determining whether or not the revolution angle is greater than or equal to the predetermined value, a predetermined number or more of pieces of data are acquired as the angular displacement amount data group to be used for deriving the inclination angle, described later.

In a case where the determination results in a positive determination, the revolution determination portion 37C finishes the acquisition of the angular velocity from the gyro sensor 41 by the angular velocity acquisition portion 37A. In addition, display for notifying the user to finish the revolution of the revolution mechanism 16 is performed on the display 43B.

The inclination angle data group derivation portion 37D derives an inclination angle data group in a case where the determination in the revolution determination portion 37C results in a positive determination. As will be described in detail later, the inclination angle data group derivation portion 37D derives a data group of the angle θ of the inclination of the surveillance camera 10 with respect to the revolution mechanism 16 based on the angular displacement amount data group acquired from the memory 35. The inclination angle data group derivation portion 37D outputs the derived inclination angle data group to the reliability degree derivation portion 37E.

The reliability degree derivation portion 37E derives a reliability degree based on the inclination angle data group. The reliability degree is an indicator indicating whether or not the inclination angle data group is a high accuracy data group that does not include a noise and has small variations in data. A value of the reliability degree is increased as the accuracy of the data group is increased. As an example, as will be described in detail later, the reliability degree derivation portion 37E derives the reliability degree from the inclination angle data group using a statistical method. The reliability degree derivation portion 37E outputs the derived reliability degree to the reliability degree determination portion 37F.

The reliability degree determination portion 37F determines whether or not the reliability degree is greater than a predetermined degree. In a case where it is determined that the reliability degree of the inclination angle data group is greater than the predetermined degree, the reliability degree determination portion 37F outputs the inclination angle data group to the inclination angle derivation portion 37G.

The inclination angle derivation portion 37G derives the angle θ of the inclination from the inclination angle data group. The inclination angle derivation portion 37G outputs the derived angle θ of the inclination to the image processing portion 37H. The angle θ of the inclination is an example of "information related to inclination" according to the embodiment of the disclosed technology.

The image processing portion 37H performs image processing on the captured image to resolve the misregistration of the captured image due to the inclination of the surveillance camera 10. Specifically, the image processing portion 37H acquires the digital image from the image memory 32. The image processing portion 37H rotates the captured image in a direction in which the inclination of the captured image due to the inclination of the surveillance camera 10 is resolved, based on the angle θ of the inclination.

Figure 11:
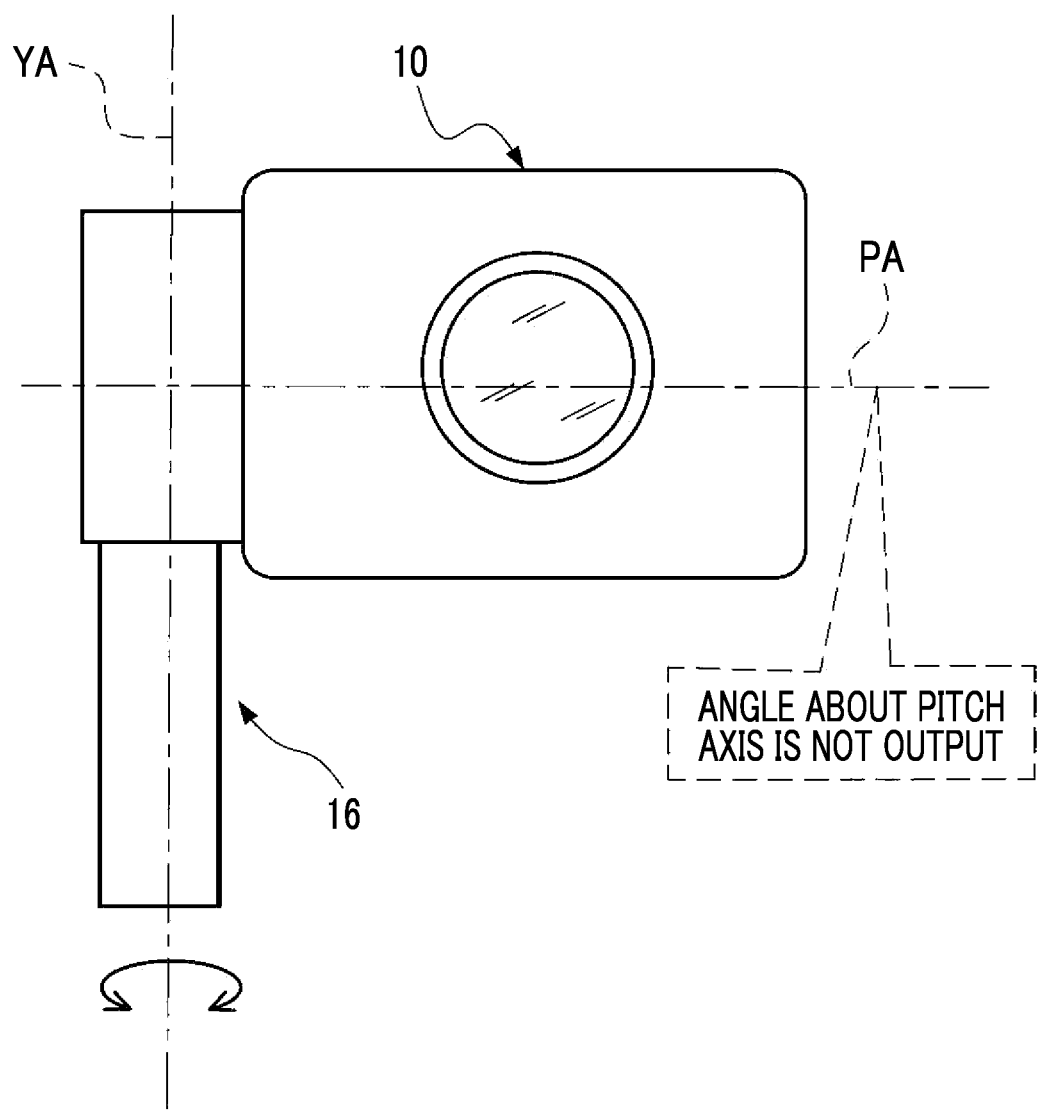
FIG. 11 is a conceptual diagram for describing resolving of the misregistration by an imaging support device according to the embodiment.
Figure 12:
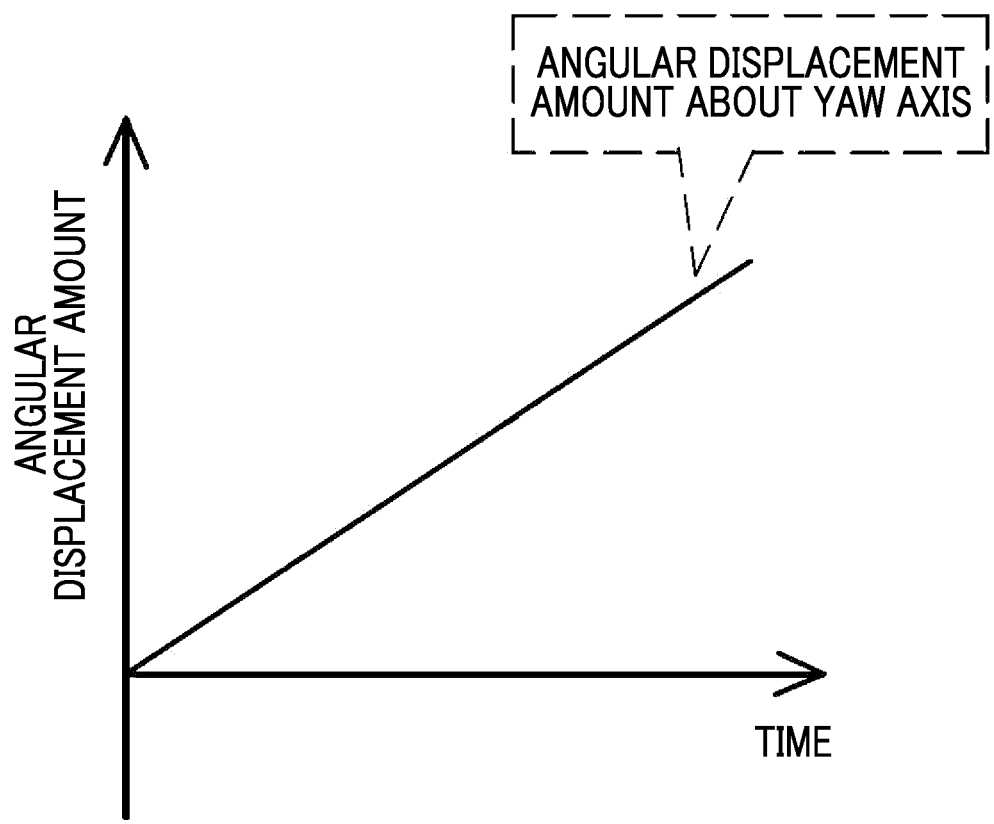
FIG. 12 is a conceptual diagram for describing the resolving of the misregistration by the imaging support device according to the embodiment.

Next, a method of deriving the angle θ of the inclination of the rotation direction about the roll axis RA as a central axis from the angular displacement amount data group obtained by the revolution about the yaw axis YA and the pitch axis PA as a central axis will be described. First, as illustrated in FIG. 11 as an example, a case where the surveillance camera 10 is attached to the revolution mechanism 16 without inclination will be described. In this case, as an example, in a case where the revolution mechanism 16 causes the surveillance camera 10 to revolve about the yaw axis YA as a central axis, the gyro sensor 41 of the surveillance camera 10 detects the revolution about the yaw axis YA as a central axis. The pitch axis PA of the surveillance camera 10 is orthogonal to the yaw axis YA that is the central axis of the revolution. Thus, as illustrated in FIG. 12 as an example, only the angular displacement amount about the yaw axis YA based on the revolution about the yaw axis YA as a central axis is obtained from an output result of the gyro sensor 41 as the angular displacement amount. That is, in a case where the surveillance camera 10 is not inclined with respect to the revolution mechanism 16, the angular displacement amount of the revolution about the pitch axis PA as a central axis is not obtained from the output result of the gyro sensor 41 even in a case where the surveillance camera 10 is caused to revolve about the yaw axis YA as a central axis by the revolution mechanism 16.

Figure 13:
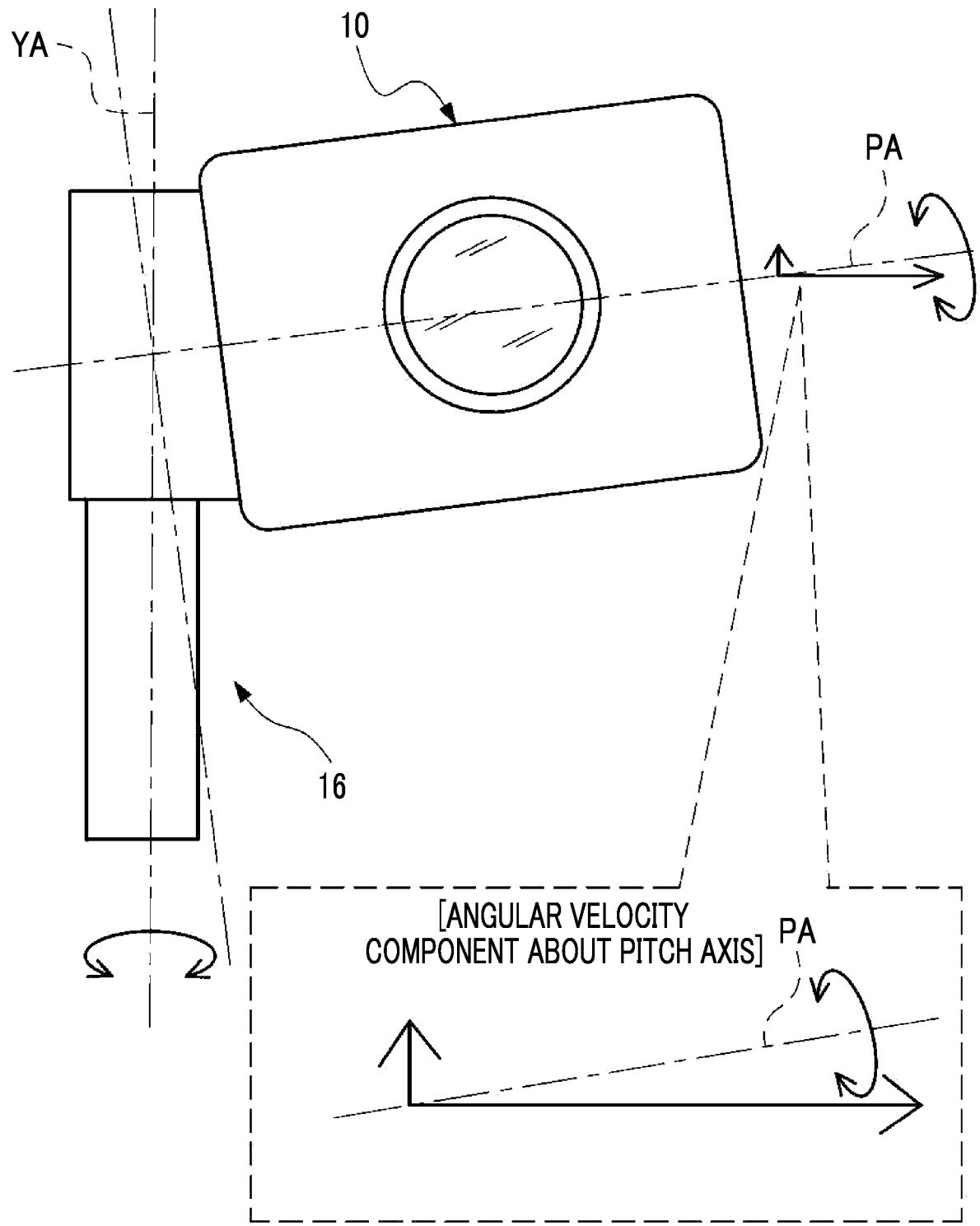
FIG. 13 is a conceptual diagram for describing the resolving of the misregistration by the imaging support device according to the embodiment.

On the other hand, as illustrated in FIG. 13 as an example, in a case where the surveillance camera 10 is attached to the revolution mechanism 16 in an inclined manner, the gyro sensor 41 detects the revolution about the yaw axis YA as a central axis in a case where the revolution mechanism 16 causes the surveillance camera 10 to revolve about the yaw axis YA as a central axis. Furthermore, since the surveillance camera 10 is inclined with respect to the revolution mechanism 16, the pitch axis PA of the surveillance camera 10 is inclined with respect to the yaw axis YA that is the central axis of the revolution. Thus, in the revolution about the yaw axis YA as a central axis, the gyro sensor 41 also detects the revolution about the pitch axis PA as a central axis.

That is, as illustrated in FIG. 13 as an example, due to the attachment of the surveillance camera 10 to the revolution mechanism 16 in an inclined manner, the angular velocity accompanied by the revolution about the pitch axis PA as a central axis in the surveillance camera 10 changes even in a case where the revolution is performed about only the yaw axis YA as a central axis. In other words, in the surveillance camera 10, kinetic energy of the revolution about the pitch axis PA as a central axis is increased by an amount of decrease in kinetic energy required for the revolution about the yaw axis YA as a central axis. Consequently, the gyro sensor 41 outputs the angular velocity of the revolution about the pitch axis PA as a central axis in the surveillance camera 10.

Figure 14:
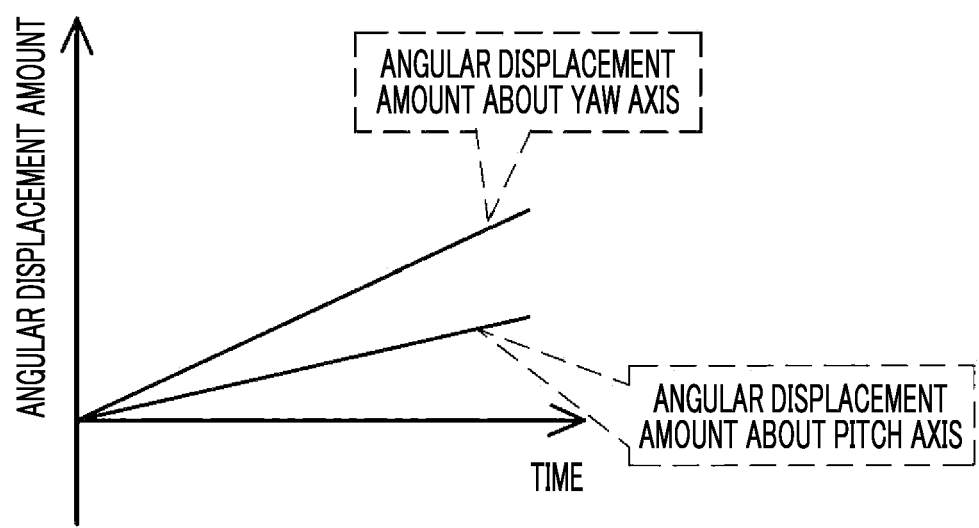
FIG. 14 is a conceptual diagram for describing the resolving of the misregistration by the imaging support device according to the embodiment.

As illustrated in FIG. 14 as an example, in a case where the surveillance camera 10 is attached to the revolution mechanism 16 in an inclined manner, the angular displacement amount based on the revolution about the pitch axis PA as a central axis is also obtained from the output of the angular velocity from the gyro sensor 41 based on the revolution about the yaw axis YA as a central axis, in addition to the angular displacement amount about the yaw axis YA of the surveillance camera 10. In such a manner, the obtaining of the angular displacement amount based on the revolution about the pitch axis PA as a central axis regardless of the revolution of the surveillance camera 10 about the yaw axis YA as a central axis is caused by the inclination of the surveillance camera 10 as described above.

At this point, as the angle θ of the inclination of the surveillance camera 10 is increased, the angular displacement amount about the pitch axis PA is increased. As an extreme example, when the angle θ of the inclination of the surveillance camera 10 is 90 degrees, only the revolution about the pitch axis PA is detected, and the revolution about the yaw axis YA is not detected in the surveillance camera 10. That is, a ratio of outputs for each axis from the gyro sensor 41 that detects the revolution about each of the yaw axis YA and the pitch axis PA as a central axis depends on the angle θ of the inclination of the surveillance camera 10 with respect to the revolution mechanism 16.

As described above, the angular displacement amount in the revolution about each of the yaw axis YA and the pitch axis PA as a central axis corresponds to the angle θ of the inclination of the surveillance camera 10 with respect to the revolution mechanism 16. That is, in the surveillance camera 10, the angle θ of the inclination of the surveillance camera 10 with respect to the revolution mechanism 16 can be derived from the output ratio of the gyro sensor 41 in the revolution about the yaw axis YA and the pitch axis PA as a central axis.

Hereinafter, a specific method of deriving the inclination angle will be described. First, the angular displacement amount per unit time period is obtained by standardizing the angular displacement amount data group for the yaw axis YA and the pitch axis PA of the surveillance camera 10 with respect to time. Furthermore, the angle θ of the inclination of the surveillance camera 10 with respect to the revolution mechanism 16 is derived from the angular displacement amount per unit time period. That is, in the surveillance camera 10, the inclination of the surveillance camera 10 with respect to the revolution mechanism 16 can be derived from a degree of difference in angular displacement amount per unit time period in the revolution about the yaw axis YA and the pitch axis PA as a central axis. Specifically, the angle θ of the inclination of the surveillance camera 10 with respect to the revolution mechanism 16 can be derived from a ratio of the angular displacement amount per unit time period in the revolution about the yaw axis YA as a central axis and the angular displacement amount per unit time period in the revolution about the pitch axis PA as a central axis.

Figure 15:
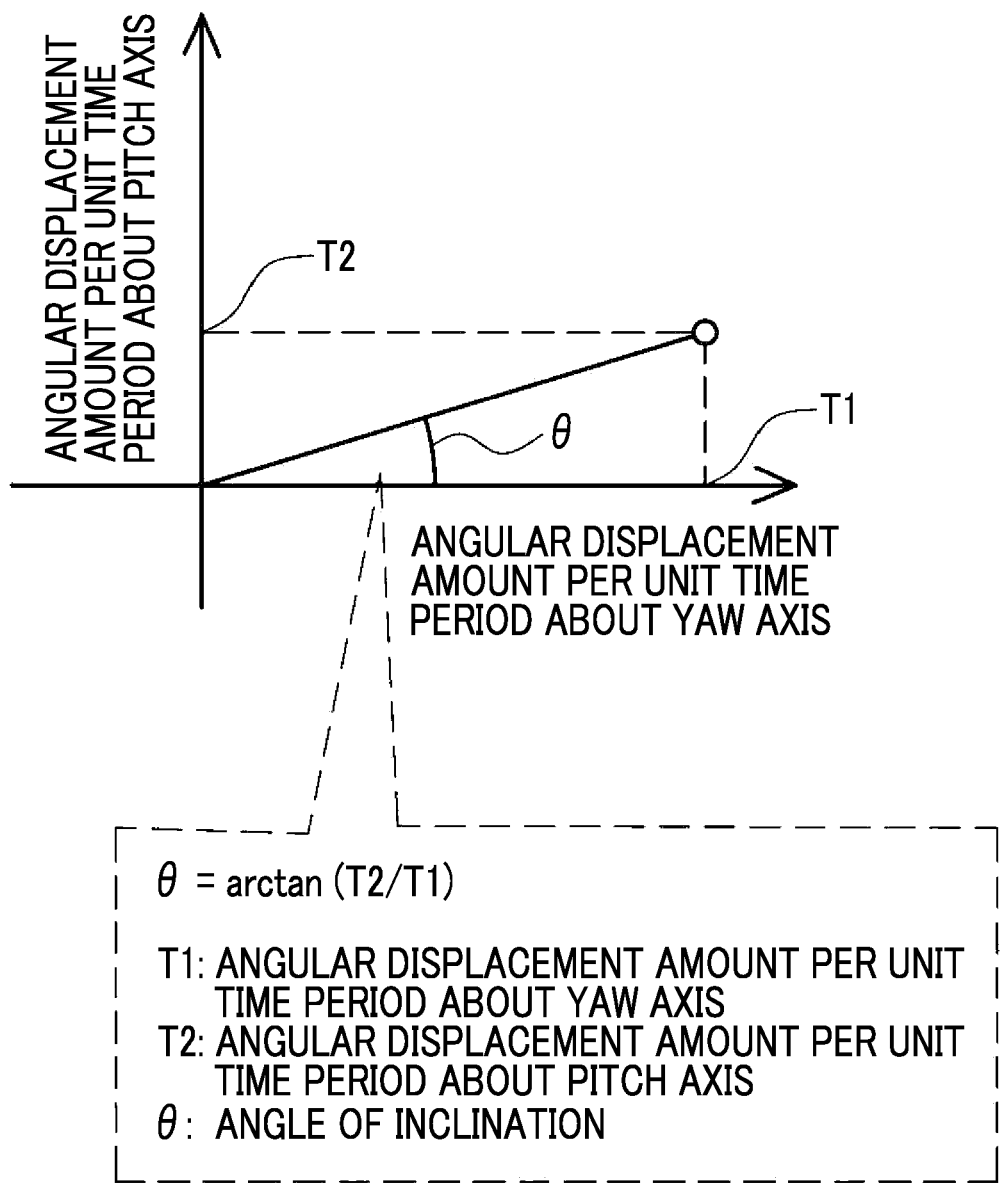
FIG. 15 is a conceptual diagram for describing the resolving of the misregistration by the imaging support device according to the embodiment.

More specifically, as illustrated in FIG. 15 as an example, the angle θ of the inclination of the surveillance camera 10 with respect to the revolution mechanism 16 can be obtained from Expression (1) below.

$$\theta = \arctan(T2/T1) \cdots \quad (1)$$

θ: the angle of the inclination of the surveillance camera 10 (degree)

T1: a displacement amount of the revolution angle per unit time period about the yaw axis YA (degree/s)

T2: a displacement amount of the revolution angle per unit time period about the pitch axis PA (degree/s)

Furthermore, as will be described below, a noise corresponding to a change in revolution state may occur in the angular displacement amount data group. Therefore, in the derivation of the angle θ of the inclination of the surveillance camera 10, the angle θ of the inclination is derived after processing of removing the noise is performed.

Figure 16:
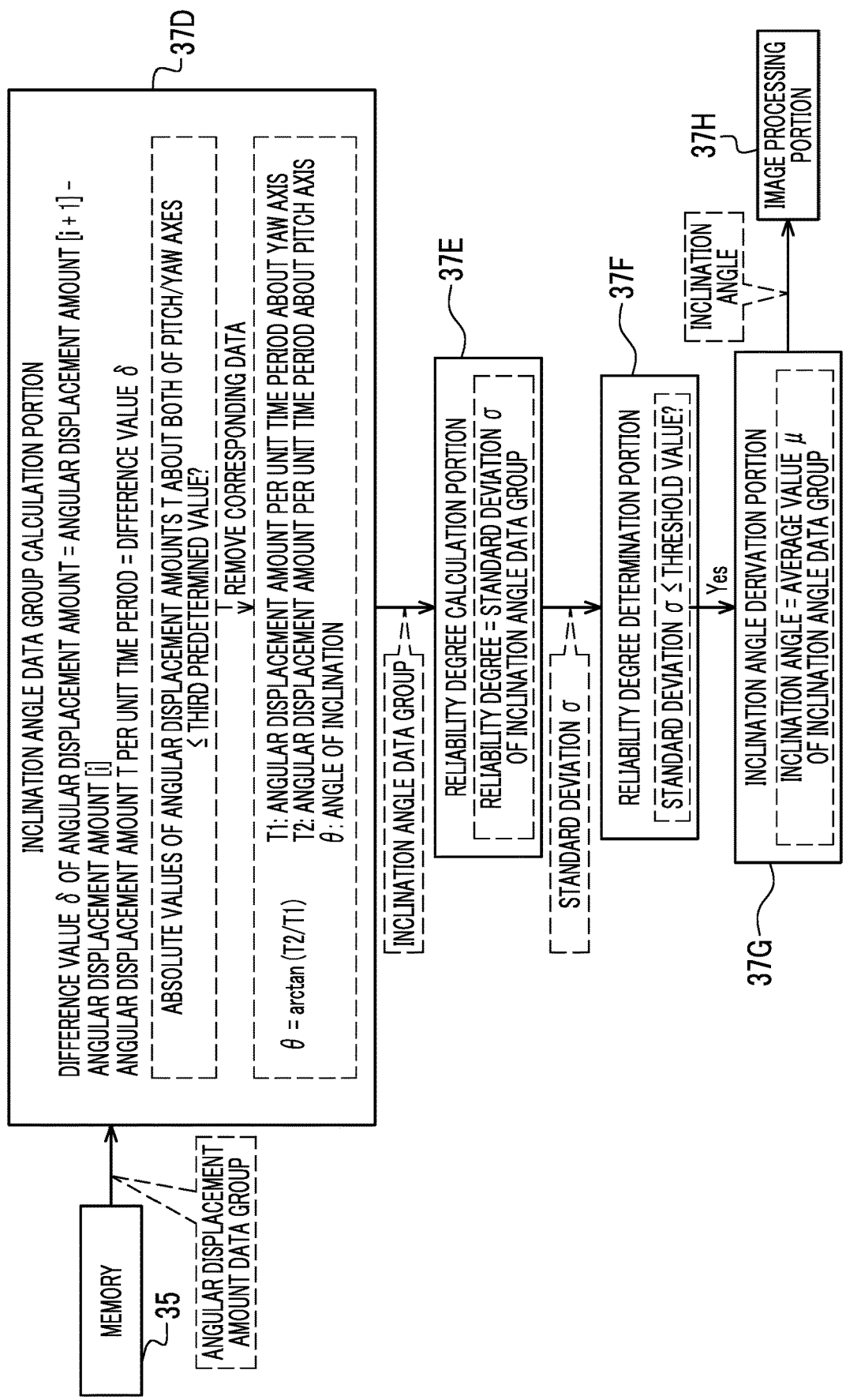
FIG. 16 is a function block diagram illustrating an example of the functions of the CPU included in the surveillance camera according to the embodiment.

First, the angular displacement amount per unit time period is obtained by standardizing the angular displacement amount data group for the yaw axis YA and the pitch axis PA of the surveillance camera 10 with respect to time. Specifically, as illustrated in FIG. 16 as an example, in the inclination angle data group derivation portion 37D, a difference value δ of the angular displacement amount is derived from the angular displacement amount data group acquired from the memory 35 based on Expression (2) below.

$$\delta = t[i+1] - t[i] \cdots \quad (2)$$

δ: the difference value of the angular displacement amount t[i]: an i-th acquired angular displacement amount i: any integer of 1 to n−1 (n is the number of pieces of acquired data)

Here, in a case where the acquisition of each data of the angular displacement amount in the angular displacement amount data group is performed at the predetermined time interval, the difference value δ of the angular displacement amount can be considered as an angular displacement amount T per unit time period. That is, Relational Expression (3) below is established.

$$T = \delta \cdots \quad (3)$$

T: the angular displacement amount per unit time period

δ: the difference value of the angular displacement amount

Figure 17:
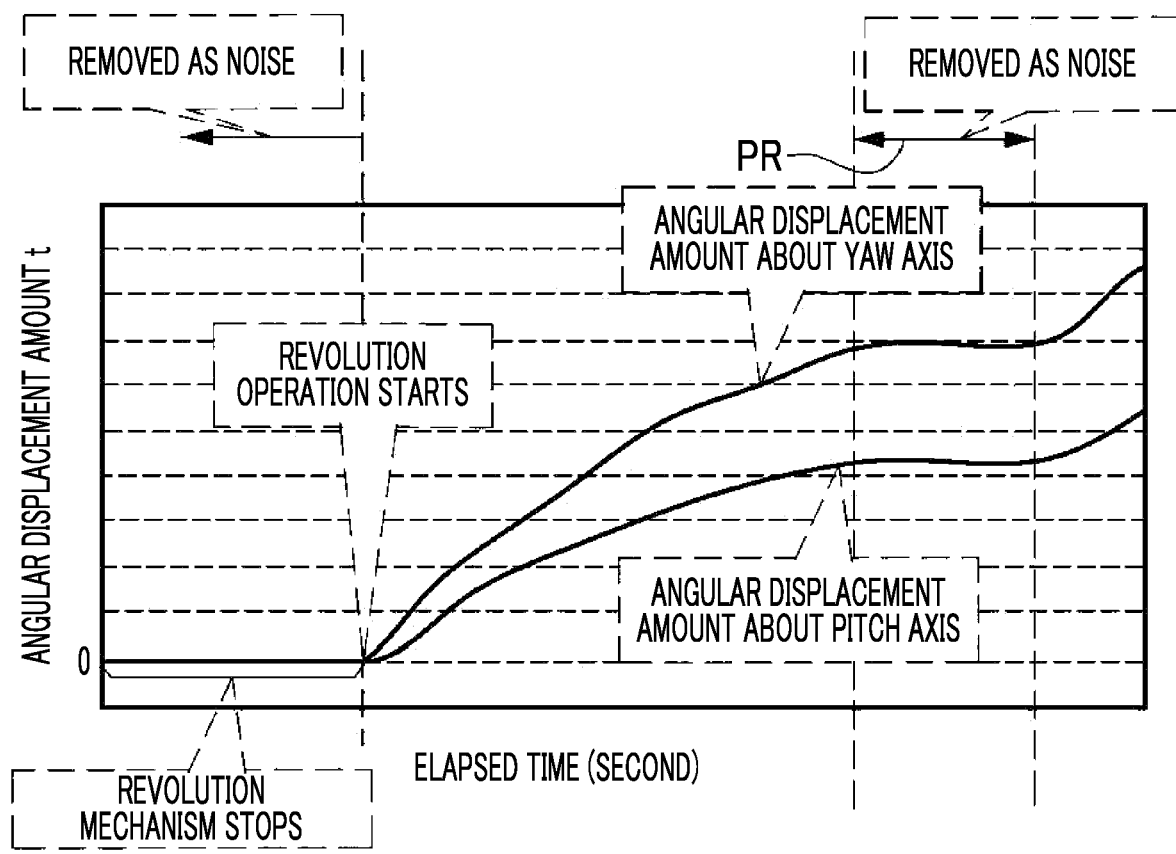
FIG. 17 is a conceptual diagram illustrating an example of detection of an angular displacement amount according to the embodiment.
Figure 18:
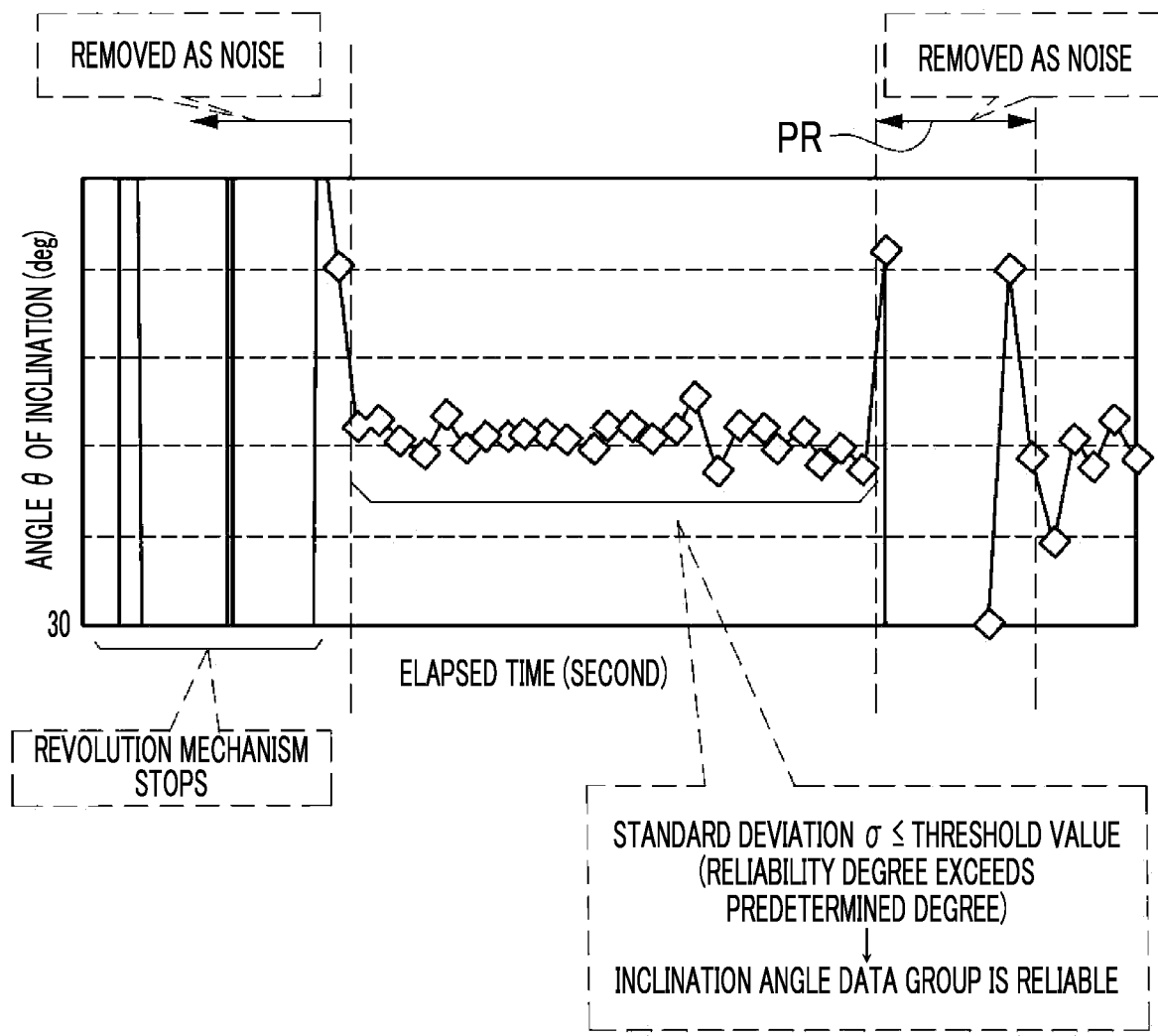
FIG. 18 is a conceptual diagram illustrating an example of an inclination angle according to the embodiment.

The noise is removed from the angular velocity data group using the obtained angular displacement amount T per unit time period. Specifically, in the inclination angle data group derivation portion 37D, a determination as to whether or not an absolute value of the angular displacement amount T per unit time period is less than or equal to a third predetermined value is performed. As illustrated in FIG. 17 as an example, a case where the angle θ of the inclination is derived based on the angular displacement amount while the revolution mechanism 16 is stopped is considered. In this case, as illustrated in FIG. 18 as an example, both of the displacement amount T1 of the revolution angle per unit time period about the yaw axis YA and the displacement amount T2 of the revolution angle per unit time period about the pitch axis PA are approximately zero. Thus, according to Expression (1), the angle θ of the inclination is indefinite, and the angle θ of the inclination significantly changes. Thus, in a case where the inclination angle data group is derived from the angular displacement amount data group in a case where the revolution mechanism 16 is stopped, variations in the angle θ of the inclination are increased. Therefore, data for which the revolution mechanism 16 is stopped and does not revolve, and the angular displacement amount almost does not change is removed as the noise. Specifically, a determination as to whether or not both of absolute values of the angular displacement amounts T1 and T2 per unit time period are less than or equal to the third predetermined value is performed. An angular displacement amount t used in the calculation of the angular displacement amount T for which the determination results in a positive determination is removed from the angular displacement amount data group as the noise. Consequently, the angular displacement amount in a case where the angular displacement amount T per unit time period is less than or equal to the third predetermined value as in a case where the revolution mechanism 16 is stopped is removed from the angular displacement amount data group. The third predetermined value is set to a value close to zero by its nature.

In addition, even in a case where the revolution mechanism 16 is operating, both of the displacement amount T1 of the revolution angle per unit time period about the yaw axis YA and the displacement amount T2 of the revolution angle per unit time period about the pitch axis PA may be approximately zero as in a period PR illustrated in FIG. 17 as an example. The angular displacement amount in this case is also removed from the angular displacement amount data group as the noise.

Figure 19:
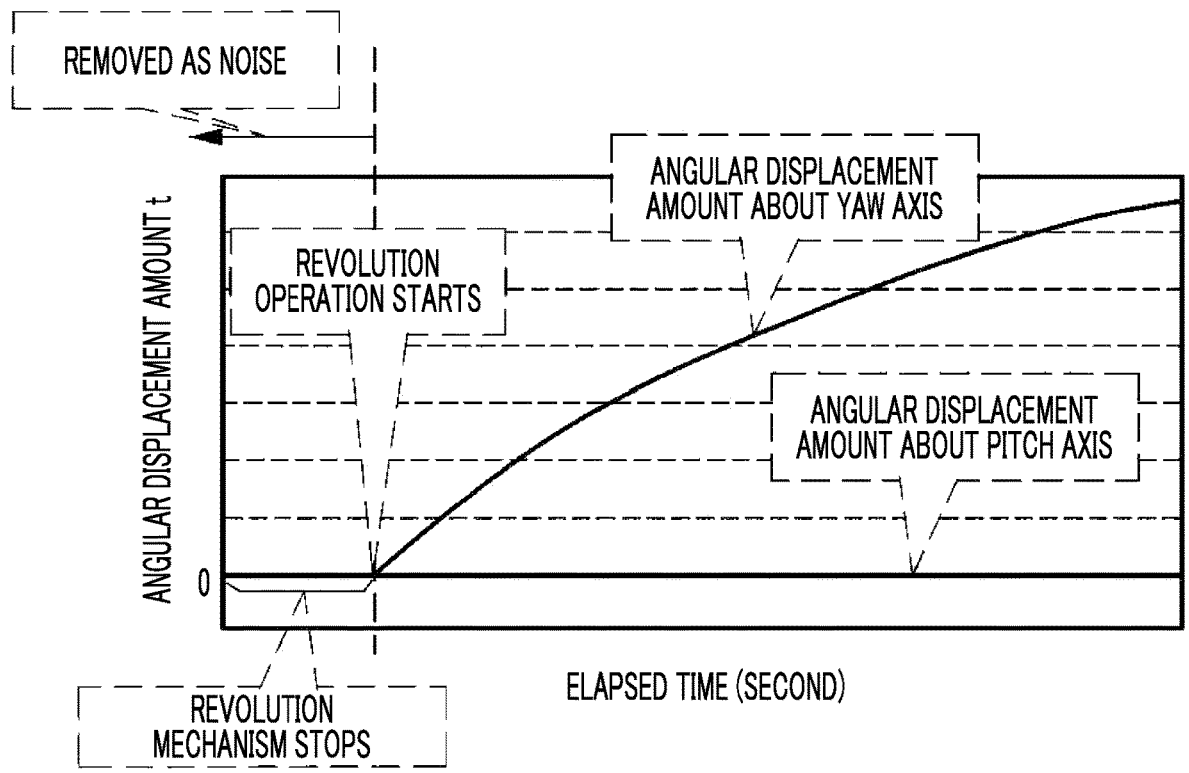
FIG. 19 is a conceptual diagram illustrating an example of the detection of the angular displacement amount according to the embodiment.
Figure 20:
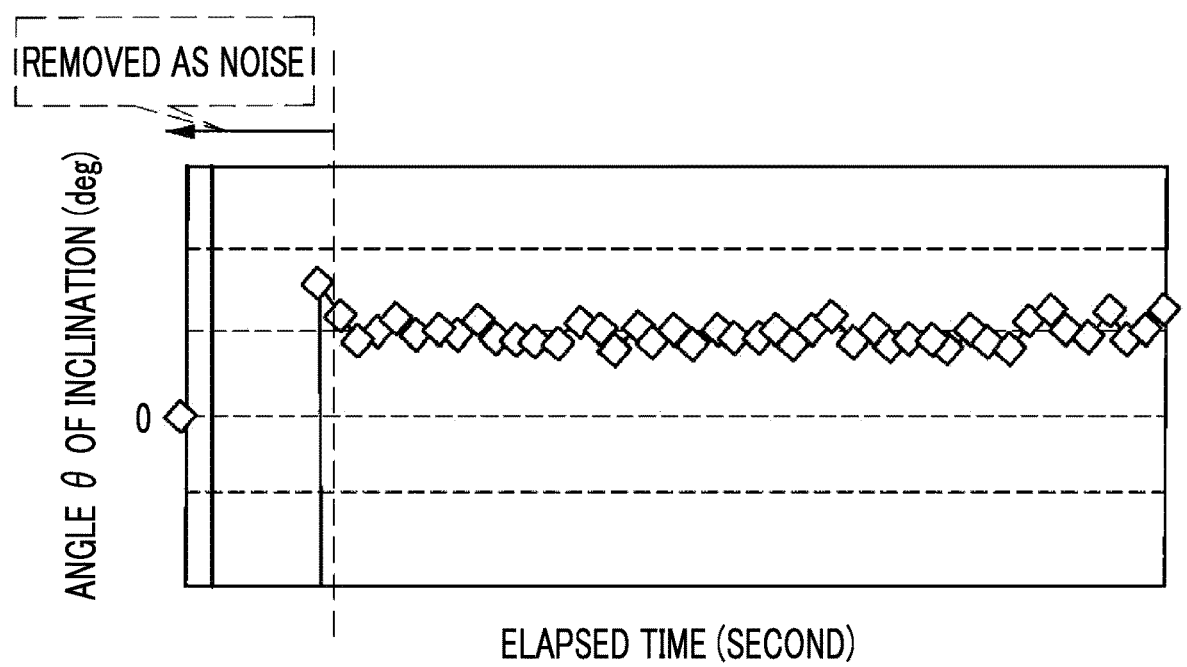
FIG. 20 is a conceptual diagram illustrating an example of the inclination angle according to the embodiment.

The same applies to a case where the surveillance camera 10 is attached to the revolution mechanism 16 without inclination. As illustrated in FIG. 19 as an example, data for which the revolution mechanism 16 is stopped and does not revolve, and the angular displacement amount almost does not change is removed as the noise. In addition, the angular displacement amount t about the pitch axis PA is approximately zero. Accordingly, the displacement amount T2 of the revolution angle per unit time period about the pitch axis PA has a value close to approximately zero and almost does not change. Consequently, as illustrated in FIG. 20 as an example, while the angle θ of the inclination is derived, the angle θ of the inclination has a value close to approximately zero. In such a case, it is said that the inclination of the surveillance camera 10 that is a target for adjustment in the disclosed technology does not occur.

The noise is removed from the angular displacement amount data group through the determination in the inclination angle data group derivation portion 37D as described above. A data group of the angle θ of the inclination is derived from the angular displacement amount data group in which the noise is removed, using Expression (1).

Figure 21:
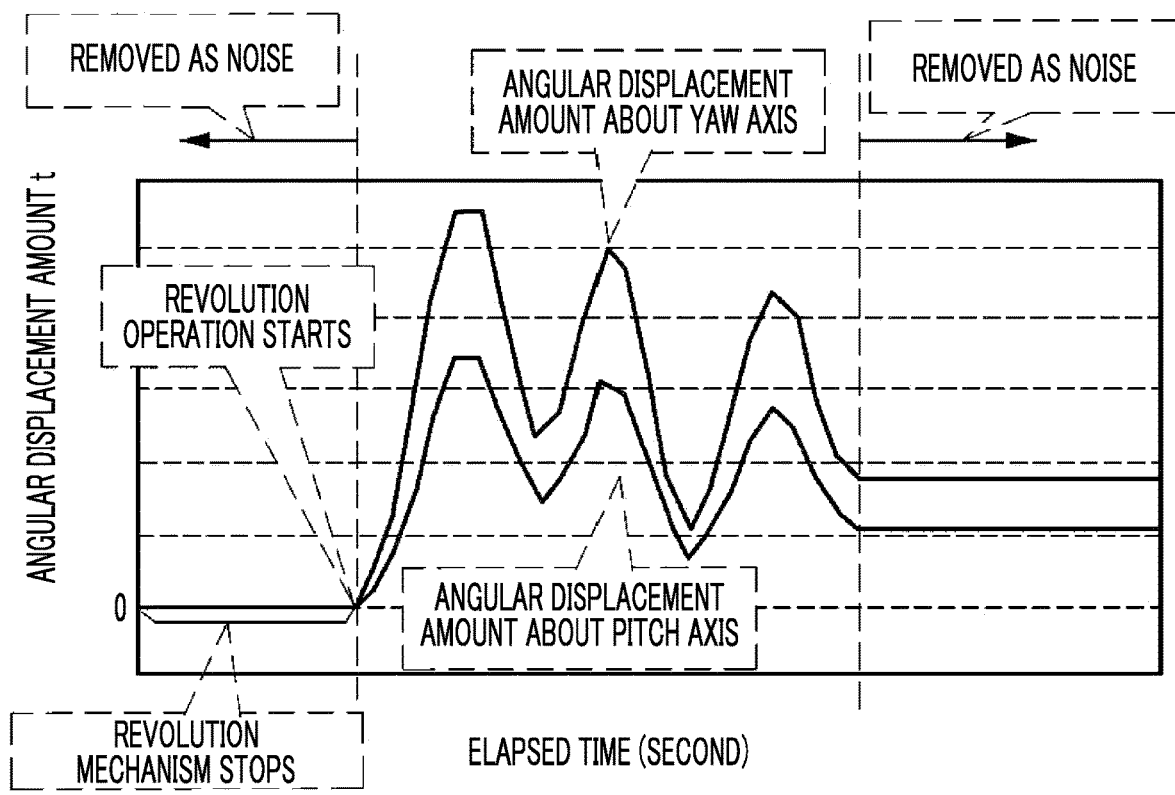
FIG. 21 is a conceptual diagram illustrating an example of the detection of the angular displacement amount according to the embodiment.
Figure 22:
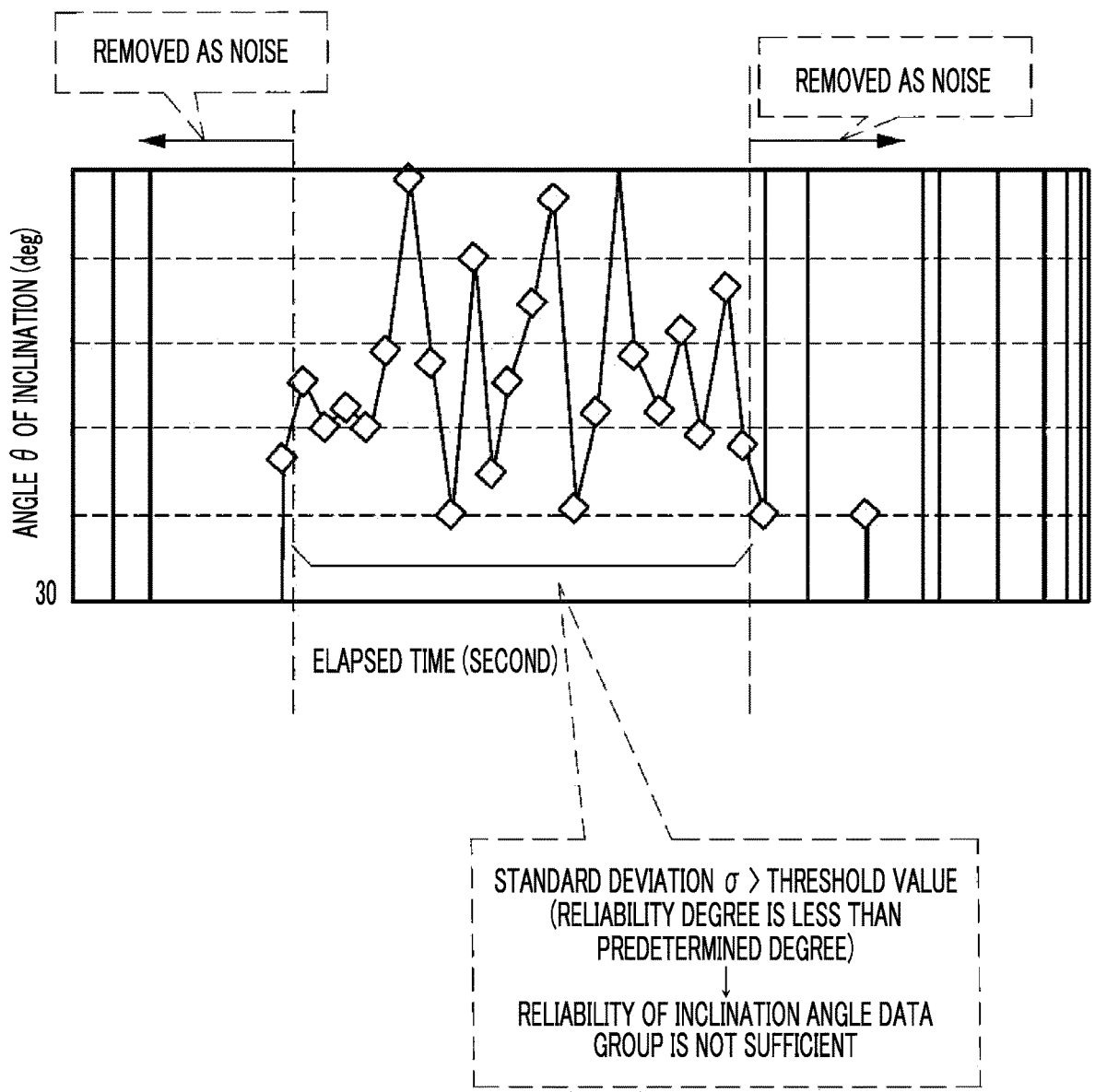
FIG. 22 is a conceptual diagram illustrating an example of the inclination angle according to the embodiment.

Furthermore, reliability of data acquired for deriving the angle θ of the inclination may be decreased depending on an operation situation of the revolution mechanism 16. That is, the revolution by the revolution mechanism 16 may not be performed under a predetermined condition, and an acquisition condition of the data may change. Examples of such a situation include a case where the revolution mechanism 16 is not operating well, or a case where an effect of a vibration in an edge part around the revolution mechanism 16 is high. As illustrated in FIG. 21 as an example, the revolution may not be performed in only one direction of a clockwise direction and a counterclockwise direction. The revolution in one direction of the clockwise direction and the counterclockwise direction may be performed, and then, the revolution in the other direction of the clockwise direction and the counterclockwise direction may be performed. In this case, as illustrated in FIG. 22 as an example, in a case where the angle θ of the inclination is derived, the angle θ of the inclination significantly changes. In a case where the angle θ of the inclination that significantly changes is used, the misregistration of the captured image is not appropriately resolved.

Therefore, in the reliability degree derivation portion 37E, the reliability degree related to the inclination angle data group is derived by performing statistical processing on the inclination angle data group. As an example, the reliability degree of the inclination angle data group is a standard deviation a of the inclination angle data group. The reliability degree derivation portion 37E derives the standard deviation a from the inclination angle data group using a well-known statistical method.

The reliability degree determination portion 37F determines whether or not the standard deviation a of the inclination angle data group is less than or equal to a threshold value. In a case where the standard deviation a of the inclination angle data group is less than or equal to the threshold value, the reliability degree determination portion 37F determines that variations in a plurality of inclination angles θ constituting the inclination angle data group are small, and the reliability of the inclination angle data group is secured.

FIG. 18 illustrates a case where the standard deviation a of the inclination angle data group is less than or equal to the threshold value, and the reliability degree determination portion 37F determines that the inclination angle data group is reliable. On the other hand, FIG. 22 illustrates a case where the standard deviation a of the inclination angle data group is greater than the threshold value, and the reliability degree determination portion 37F determines that the reliability of the inclination angle data group is not sufficient.

In a case where the determination in the reliability degree determination portion 37F results in a positive determination, the inclination angle derivation portion 37G derives an average value of the inclination angle data group as the angle θ of the inclination to be used for adjusting the misregistration of the captured image. The inclination angle derivation portion 37G outputs the derived value of the angle θ of the inclination to the image processing portion 37H. A mode or a median of the inclination angle data group may be derived as the angle θ of the inclination.

Figure 23:
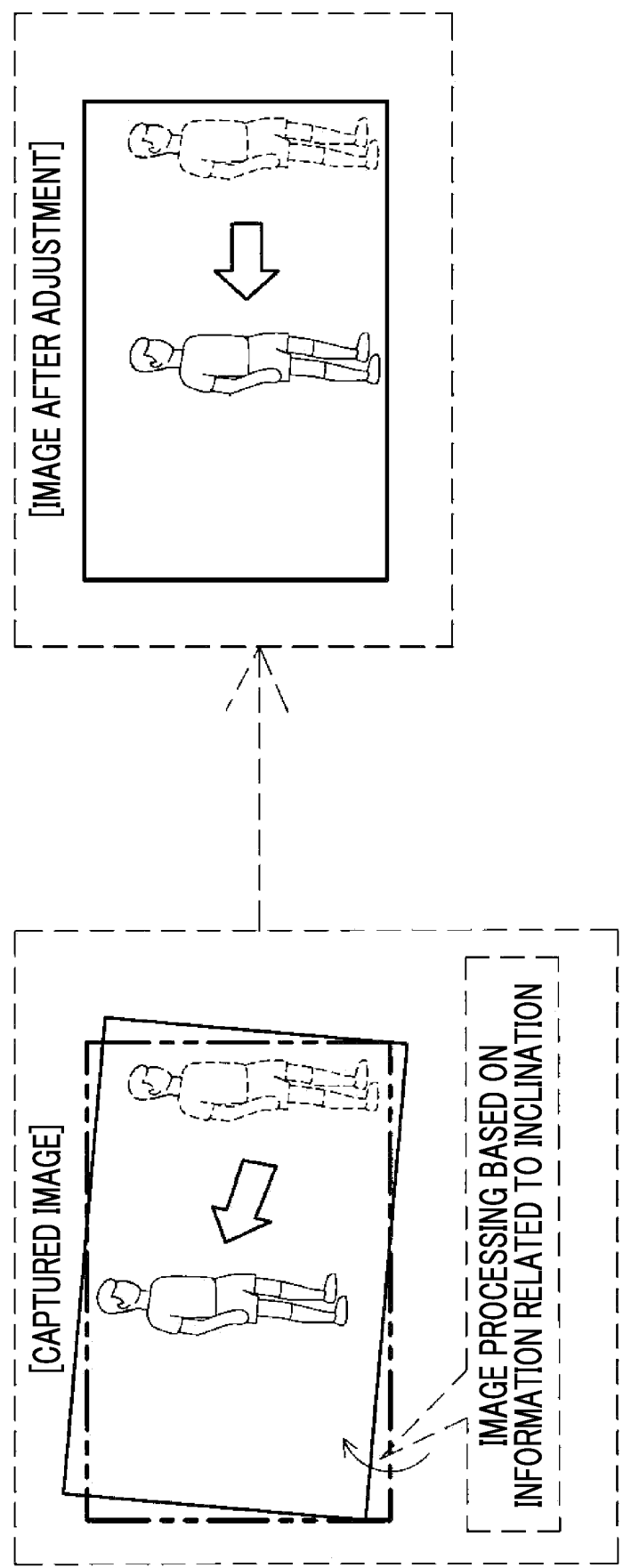
FIG. 23 is a conceptual diagram illustrating an example of adjustment of inclination of a captured image according to the embodiment.

As illustrated in FIG. 23 as an example, the image processing portion 37H performs the image processing to rotate the captured image in the direction in which the inclination of the captured image due to the inclination of the surveillance camera 10 is resolved, based on the angle θ of the inclination. Consequently, as illustrated in FIG. 23 as an example, in the image after the adjustment, the misregistration of the captured image is resolved, and the specific subject image moves in the horizontal direction in the captured image in accordance with the revolution of the surveillance camera 10 about the yaw axis YA as a central axis. Thus, imaging by the surveillance camera 10 is easily performed. Particularly, in a case where the surveillance camera 10 has the tracking function, the revolution operation of the surveillance camera 10 matches a change in position of the specific subject image in the captured image by the revolution operation. Thus, the specific subject is easily tracked using the tracking function.

Figure 24:
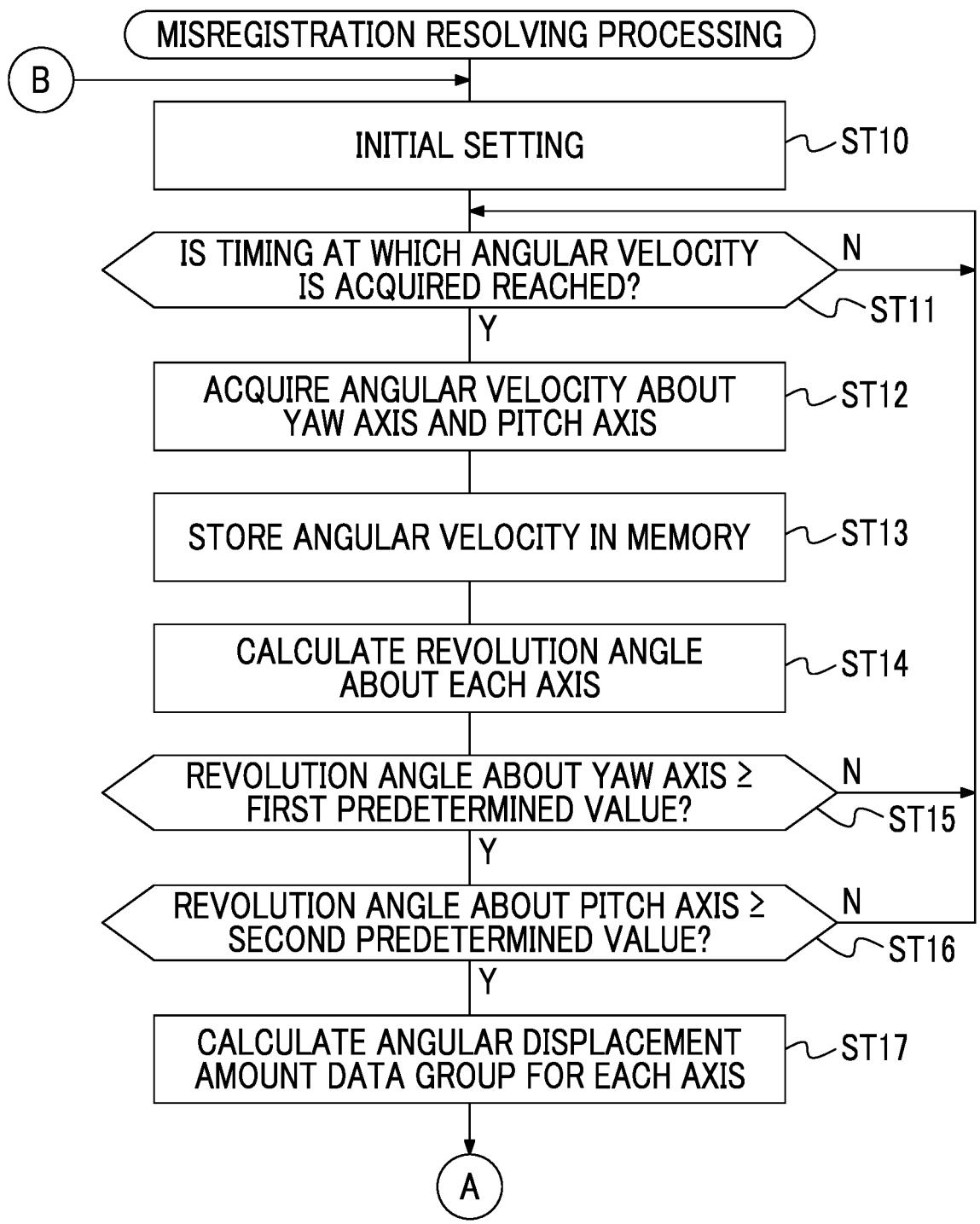
FIG. 24 is a flowchart illustrating an example of a flow of misregistration resolving processing according to the embodiment.
Figure 25:
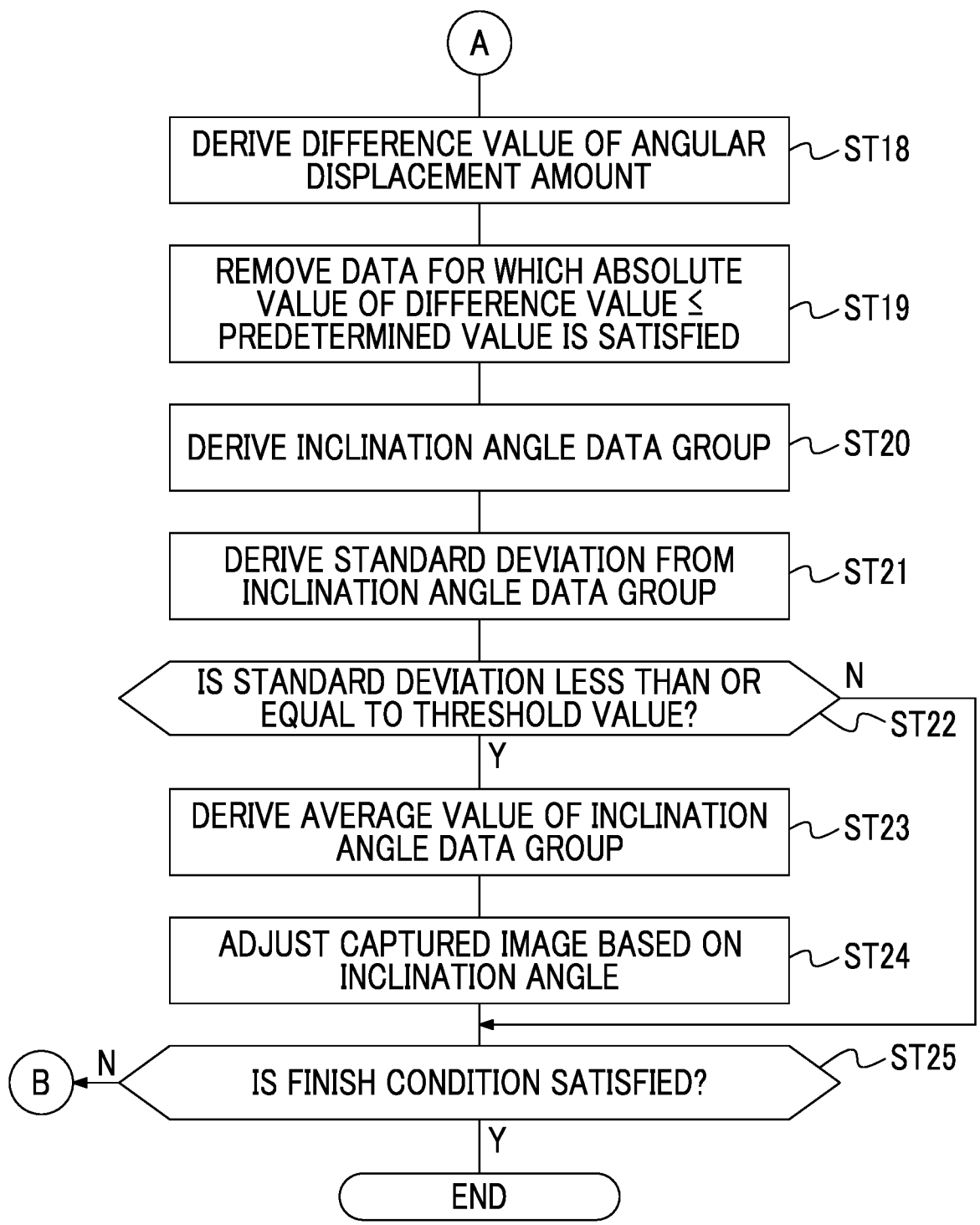
FIG. 25 is a flowchart illustrating an example of the flow of misregistration resolving processing according to the embodiment.

Next, actions of parts of the surveillance system 2 according to the embodiment of the disclosed technology will be described with reference to FIG. 24 and FIG. 25. FIG. 24 and FIG. 25 illustrate an example of a flow of misregistration resolving processing executed by the CPU 37. The flow of misregistration resolving processing illustrated in FIG. 24 and FIG. 25 is an example of an "imaging support method" according to the embodiment of the disclosed technology.

In the misregistration resolving processing illustrated in FIG. 24 as an example, first, in step ST10, the CPU 37 resets the angular velocity data group and the angular displacement amount data group stored in the memory 35. In step ST11, the angular velocity acquisition portion 37A determines whether or not a timing at which the angular velocity is acquired is reached. In a case where the timing at which the angular velocity is acquired is not reached, a negative determination is made, and the misregistration resolving processing repeats step ST11. In step ST11, in a case where the timing at which the angular velocity is acquired is reached, a positive determination is made, and the misregistration resolving processing transitions to step ST12.

In step ST12, the angular velocity acquisition portion 37A acquires the most recent angular velocity for each of the yaw axis YA and the pitch axis PA from the gyro sensor 41. Then, the misregistration resolving processing transitions to step ST13.

In step ST13, the angular velocity acquisition portion 37A stores the most recent angular velocity acquired in step ST12 in the memory 35 as a part of the angular velocity data group. Then, the misregistration resolving processing transitions to step ST14.

In step ST14, the angular displacement amount derivation portion 37B derives the revolution angle of the revolution about the yaw axis YA and the pitch axis PA as a central axis from the angular velocity data group stored in the memory 35. Then, the misregistration resolving processing transitions to step ST15.

In step ST15, the revolution determination portion 37C determines whether or not the revolution angle about the yaw axis YA is greater than or equal to the first predetermined value. In a case where the revolution angle about the yaw axis YA is less than the first predetermined value, a negative determination is made, and the misregistration resolving processing transitions to step ST11. In a case where the revolution angle about the yaw axis YA is greater than or equal to the first predetermined value, a positive determination is made, and the misregistration resolving processing transitions to step ST16.

In step ST16, the revolution determination portion 37C determines whether or not the revolution angle about the pitch axis PA is greater than or equal to the second predetermined value. In a case where the revolution angle about the pitch axis PA is less than the second predetermined value, a negative determination is made, and the misregistration resolving processing transitions to step ST11. In a case where the revolution angle about the pitch axis PA is greater than or equal to the second predetermined value, a positive determination is made, and the misregistration resolving processing transitions to step ST17.

In step ST17, the angular displacement amount derivation portion 37B derives the angular displacement amount data group by integrating the angular velocity data group with respect to time. The angular displacement amount derivation portion 37B stores the angular displacement amount data group in the memory 35.

In the misregistration resolving processing illustrated in FIG. 25 as an example, in step ST18, the inclination angle data group derivation portion 37D derives the difference value δ of the angular displacement amount, that is, the angular displacement amount T per unit time period, from the angular displacement amount data group acquired from the memory 35. Then, the misregistration resolving processing transitions to step ST19.

In step ST19, the inclination angle data group derivation portion 37D removes data for which the absolute value of the angular displacement amount T per unit time period is less than or equal to the third predetermined value as the noise in the angular displacement amount data group for the revolution about each of the yaw axis YA and the pitch axis PA as a central axis. Then, the misregistration resolving processing transitions to step ST20.

In step ST20, the inclination angle data group derivation portion 37D derives the inclination angle data group from the angular displacement amount data group in which the noise is removed. Then, the misregistration resolving processing transitions to step ST21.

In step ST21, the reliability degree derivation portion 37E derives the standard deviation σ of the inclination angle data group derived in step ST21 as the reliability degree. Then, the misregistration resolving processing transitions to step ST22.

In step ST22, the reliability degree determination portion 37F determines whether or not the standard deviation a derived in step ST21 is less than or equal to the threshold value. In a case where the standard deviation a is less than or equal to the threshold value, a positive determination is made, and the misregistration resolving processing transitions to step ST23. In a case where the standard deviation a is greater than the threshold value, a negative determination is made, and the misregistration resolving processing transitions to step ST25.

In step ST23, the inclination angle derivation portion 37G derives the average value μ from the inclination angle data group. Then, the misregistration resolving processing transitions to step ST24.

In step ST24, the image processing portion 37H adjusts the misregistration of the captured image using the average value of the inclination angle data group derived in step ST24 as the angle θ of the inclination. Then, the misregistration resolving processing transitions to step ST25.

In step ST25, the CPU 37 determines whether or not a condition (hereinafter, referred to as a "misregistration resolving processing finish condition") under which the misregistration resolving processing is finished is satisfied. Examples of the misregistration resolving processing finish condition include a condition that an instruction to finish the misregistration resolving processing is received by the reception device 62. In step ST25, in a case where the misregistration resolving processing finish condition is not satisfied, a negative determination is made, and the misregistration resolving processing transitions to step ST10. In step ST25, in a case where the misregistration resolving processing finish condition is satisfied, a positive determination is made, and the misregistration resolving processing is finished.

As in the examples illustrated in FIG. 19 and FIG. 20, in a case where the angle θ of the inclination derived in step ST24 is smaller than a predetermined angle, there is little concern that the user feels the inclination of the captured image. Thus, the adjustment of the captured image based on the angle θ of the inclination may not be performed. Setting of the predetermined angle is implemented by obtaining an angle that causes the user to feel visual weirdness due to the inclination of the captured image, in advance based on a sensory test or simulation in which the angle θ of the inclination of the surveillance camera 10 is variously changed.

In the present embodiment, while an example of a form of deriving the angle θ of the inclination of the surveillance camera 10 with respect to the revolution mechanism 16 about the roll axis RA as a central axis in the revolution about the yaw axis YA as a central axis is described, the disclosed technology is not limited thereto. For example, the inclination angle of the surveillance camera 10 with respect to the revolution mechanism 16 about the roll axis RA as a central axis may be derived in the revolution about the pitch axis PA as a central axis.

In addition, in the present embodiment, while an example of a form of resolving the misregistration by the image processing portion 37H is illustratively described, the disclosed technology is not limited thereto. For example, the misregistration may be resolved by the electronic shake correction portion 33. In this case, the electronic shake correction portion 33 resolves the misregistration by performing the image processing on the captured image in the image memory 32 based on the angle θ of the inclination.

In addition, in the present embodiment, while an example of a form of storing the misregistration resolving processing program 36A in the storage 36 is illustratively described, the disclosed technology is not limited thereto. For example, the storage 60B of the management apparatus 11 may store the misregistration resolving processing program 36A. In this case, the CPU 60A executes the misregistration resolving processing in accordance with the misregistration resolving processing program 36A stored in the storage 60B. Specifically, the CPU 60A operates as an angular velocity acquisition portion corresponding to the angular velocity acquisition portion 37A, an angular displacement amount derivation portion corresponding to the angular displacement amount derivation portion 37B, a revolution determination portion corresponding to the revolution determination portion 37C, an inclination angle data group derivation portion corresponding to the inclination angle data group derivation portion 37D, a reliability degree derivation portion corresponding to the reliability degree derivation portion 37E, a reliability degree determination portion corresponding to the reliability degree determination portion 37F, an inclination angle derivation portion corresponding to the inclination angle derivation portion 37Q and an image processing portion corresponding to the image processing portion 37H by reading out the misregistration resolving processing program 36A from the storage 60B and executing the read misregistration resolving processing program 36A on the memory 60C.

In addition, in the present embodiment, while an example of a form of executing the misregistration resolving processing by any one of the CPU 37 of the surveillance camera 10 and the CPU 60A of the management apparatus 11 is illustratively described, the disclosed technology is not limited thereto. For example, the misregistration resolving processing may be executed in a distributed manner between the CPU 60A of the management apparatus 11 and the CPU 37 of the surveillance camera 10.

In addition, in the present embodiment, while an example of a form of determining whether or not the revolution angle is greater than or equal to the predetermined value in the revolution determination portion 37C is illustratively described, the disclosed technology is not limited thereto. For example, the revolution determination portion 37C may determine whether or not the revolution of the revolution mechanism 16 is performed for a predetermined time period or longer.

In addition, in the present embodiment, while an example of a form of detecting the angular velocity by the gyro sensor 41 as the shake amount detection sensor 40 and deriving the angular displacement amounts about the yaw axis YA and the pitch axis PA is illustratively described, the disclosed technology is not limited thereto. For example, the gyro sensor may be provided in the surveillance camera 10 separately from the shake amount detection sensor 40. In addition, a plurality of gyro sensors for detecting the angular velocity about each axis of the pitch axis PA and the yaw axis YA may be provided. Furthermore, the sensor is not limited to the gyro sensor as long as the rotation direction and a rotation speed of the surveillance camera 10 can be detected.

In addition, in the present embodiment, while an example of a form of determining whether or not the standard deviation a is less than or equal to the threshold value in determining the reliability of the inclination angle data group is illustratively described, the disclosed technology is not limited thereto. For example, the reliability degree determination portion 37F may determine the reliability of the inclination angle data group by determining whether or not the standard deviation a satisfies $3\sigma \leq$threshold value.

In addition, in the present embodiment, while an example of a form of using the standard deviation a as the reliability degree indicating the reliability of the inclination angle data group is illustratively described, the disclosed technology is not limited thereto. For example, a variance of the inclination angle data group may be used as the reliability degree as long as the reliability of the inclination angle data group can be statistically indicated. In addition, both of the standard deviation a and the variance of the inclination angle data group may be used as the reliability degree. That is, the reliability degree determination portion 37F may determine whether or not the standard deviation a is less than or equal to a first threshold value, and the variance is less than or equal to a second threshold value.

In addition, in the present embodiment, while an example of a form of detecting the angular velocity necessary for deriving the inclination angle while the user is causing the revolution mechanism 16 to revolve is illustrated, the disclosed technology is not limited thereto. For example, the CPU 37 may control the revolution mechanism 16 to revolve under a revolution condition necessary for deriving the inclination angle.

In addition, in the present embodiment, while an example of a form of using the ratio of the angular displacement amounts per unit time period about the yaw axis YA and the pitch axis PA as the degree of difference is illustrated, the disclosed technology is not limited thereto. For example, an absolute value of a difference between the angular displacement amounts per unit time period about the yaw axis YA and the pitch axis PA may be used as the degree of difference.

As described above, in the surveillance camera 10, the surveillance camera 10 may be attached, in an inclined manner in the rotation direction about the roll axis RA as a central axis, to the revolution mechanism 16 that enables the surveillance camera 10 to revolve about each of the pitch axis PA and the yaw axis YA as a central axis. In this case, the misregistration of the captured image due to the inclination of the surveillance camera 10 with respect to the revolution mechanism 16 is resolved by deriving the angle θ of the inclination of the rotation direction about the roll axis RA as a central axis based on the angular displacement amount data group of the surveillance camera 10 and adjusting a position of the captured image based on the angle θ of the inclination.

In the surveillance camera 10, the angle θ of the inclination is derived based on the angular displacement amount data group in a state where the surveillance camera 10 is caused to revolve about the yaw axis YA or the pitch axis PA as a central axis by the revolution mechanism 16. Accordingly, compared to a case where the revolution mechanism 16 revolves about both of the yaw axis YA and the pitch axis PA as a central axis, for example, when the revolution is performed about only the yaw axis YA as a central axis, the revolution about the pitch axis PA that is originally not detected is detected due to the inclination of the surveillance camera 10, and the angular displacement amount data group of the pitch axis PA due to the inclination is easily obtained. Thus, the angle θ of the inclination is easily derived from the angular displacement amount data group about the yaw axis YA and the pitch axis PA. Consequently, the misregistration of the captured image due to the inclination of the surveillance camera 10 with respect to the revolution mechanism 16 is efficiently resolved compared to a case where the revolution is performed about both of the yaw axis YA and the pitch axis PA as a central axis.

In the surveillance camera 10, the angle θ of the inclination is derived based on the angular displacement amount data group in a state where the revolution is performed in one direction of the revolution direction about the yaw axis YA or the pitch axis PA as a central axis. Accordingly, compared to a case where the revolution is performed in both of the one direction and the other direction, the noise of the angular displacement amount caused by a change in revolution condition is decreased, and accuracy of the angular displacement amount data group is improved. Thus, accuracy of the angle θ of the inclination derived from the angular displacement amount data group is improved. Consequently, the misregistration of the captured image due to the inclination of the surveillance camera 10 with respect to the revolution mechanism 16 is accurately resolved compared to a case of causing the imaging apparatus to revolve in both of the one direction and the other direction.

In the surveillance camera 10, the inclination angle is derived in a case where the revolution angle about the yaw axis YA as a central axis is greater than or equal to the first predetermined value, and the revolution angle about the pitch axis PA as a central axis is greater than or equal to the second predetermined value. Accordingly, compared to a case where the inclination angle is derived in a case where the angular displacement amount is less than the predetermined value, the predetermined number or more of pieces of data are acquired as the angular displacement amount data group to be used for deriving the angle θ of the inclination, and a data amount is secured. Thus, the accuracy of the angle θ of the inclination derived from the angular displacement amount data group is improved. Consequently, the misregistration of the captured image due to the inclination of the surveillance camera 10 with respect to the revolution mechanism 16 is accurately resolved compared to a case where the angle θ of the inclination is derived in a case where the angular displacement amount is less than the predetermined value.

In the surveillance camera 10, the angle θ of the inclination is derived as information related to the inclination of the surveillance camera 10, and the position of the captured image is adjusted based on the derived angle θ of the inclination. Accordingly, the adjustment is performed using a quantitative indicator that is the angle θ of the inclination of the surveillance camera 10 with respect to the revolution mechanism 16, and the misregistration of the captured image due to the inclination of the surveillance camera 10 with respect to the revolution mechanism 16 is resolved.

In the surveillance camera 10, the angle θ of the inclination is derived based on an indicator that is the degree of difference between the angular displacement amounts per unit time period about the pitch axis PA and the yaw axis YA. Accordingly, the angle θ of the inclination is simply derived using the degree of difference compared to a case where the angle θ of the inclination is derived from each angular displacement amount without considering a difference between the angular displacement amounts per unit time period about the pitch axis PA and the yaw axis YA. Consequently, the misregistration of the captured image due to the inclination of the surveillance camera 10 with respect to the revolution mechanism 16 is simply resolved.

In the surveillance camera 10, the degree of difference between the angular displacement amount per unit time period about the yaw axis YA and the angular displacement amount per unit time period about the pitch axis PA is the ratio of the angular displacement amount per unit time period about the yaw axis YA and the angular displacement amount per unit time period about the pitch axis PA. Accordingly, the angle θ of the inclination is derived based on a simply relational expression that is the ratio of the angular displacement amount per unit time period about the yaw axis YA and the angular displacement amount per unit time period about the pitch axis PA, without using a complicated calculation expression. Consequently, the misregistration of the captured image due to the inclination of the surveillance camera 10 with respect to the revolution mechanism 16 is efficiently resolved.

In the surveillance camera 10, the inclination angle data group derivation portion 37D derives the inclination angle θ based on Expression (1) in a state where the surveillance camera 10 is caused to revolve about the yaw axis YA or the pitch axis PA as a central axis by the revolution mechanism 16. Accordingly, since the angle θ of the inclination is derived based on a quantitative calculation expression that is Expression (1), the misregistration of the captured image due to the inclination of the surveillance camera 10 with respect to the revolution mechanism 16 is accurately resolved.

In the surveillance camera 10, the reliability degree derivation portion 37E derives the reliability degree of the inclination angle data group, and the reliability degree determination portion 37F determines whether or not the derived reliability degree is greater than the predetermined degree. Accordingly, the misregistration of the captured image due to the inclination of the surveillance camera 10 with respect to the revolution mechanism 16 is appropriately resolved compared to a case of adjusting the position of the captured image even in a case where the reliability degree of the inclination angle data group is less than or equal to the predetermined degree.

In the surveillance camera 10, the reliability degree is the standard deviation a of the inclination angle data group, and the reliability degree determination portion 37F determines whether or not the standard deviation a is less than or equal to the threshold value. In such a manner, by using the standard deviation a of the inclination angle data group in determining the reliability degree, the derived reliability of the angle θ of the inclination is statistically guaranteed. Consequently, the determination of the reliability degree is valid, and the misregistration of the captured image due to the inclination of the surveillance camera 10 with respect to the revolution mechanism 16 is appropriately resolved.

In the surveillance camera 10, the angular displacement amount of the surveillance camera 10 is derived based on the detection result of the sensor mounted in the surveillance camera 10. Thus, for example, compared to a case of using an external sensor for the revolution of the surveillance camera 10, the accuracy of the angular displacement amount data group is improved, and the accuracy of the angle θ of the inclination derived based on the angular displacement amount data group is improved. Consequently, the misregistration of the captured image due to the inclination of the surveillance camera 10 with respect to the revolution mechanism 16 is accurately resolved.

In the surveillance camera 10, the sensor is the gyro sensor 41 that detects the angular velocity about the yaw axis YA or the pitch axis PA as a central axis. In a case where the angular velocity data group detected by the gyro sensor 41 is integrated with respect to time, the angular displacement amount data group can be derived. Accordingly, the angle θ of the inclination can be simply derived based on the angular displacement amount data group compared to a case of deriving the angular displacement amount using, for example, an acceleration sensor. Consequently, the misregistration of the captured image due to the inclination of the surveillance camera 10 with respect to the revolution mechanism 16 is simply resolved.

In the surveillance camera 10, the image processing of rotating the captured image in the direction in which the inclination of the captured image due to the inclination of the surveillance camera 10 is resolved is performed based on the information related to the inclination. Since the position of the captured image is adjusted by the image processing, the misregistration of the captured image due to the inclination of the surveillance camera 10 with respect to the revolution mechanism 16 is resolved without adding a mechanical adjustment mechanism.

Second Embodiment

In the first embodiment, a case where the revolution mechanism 16 is caused to revolve by the user through the management apparatus 11 is described. In a present second embodiment, a case where the surveillance camera 10 causes the revolution mechanism 16 to revolve will be described. In the second embodiment, the same constituents as in the first embodiment will be designated by the same reference numerals and will not be described. Hereinafter, parts different from the first embodiment will be described.

Figure 26:
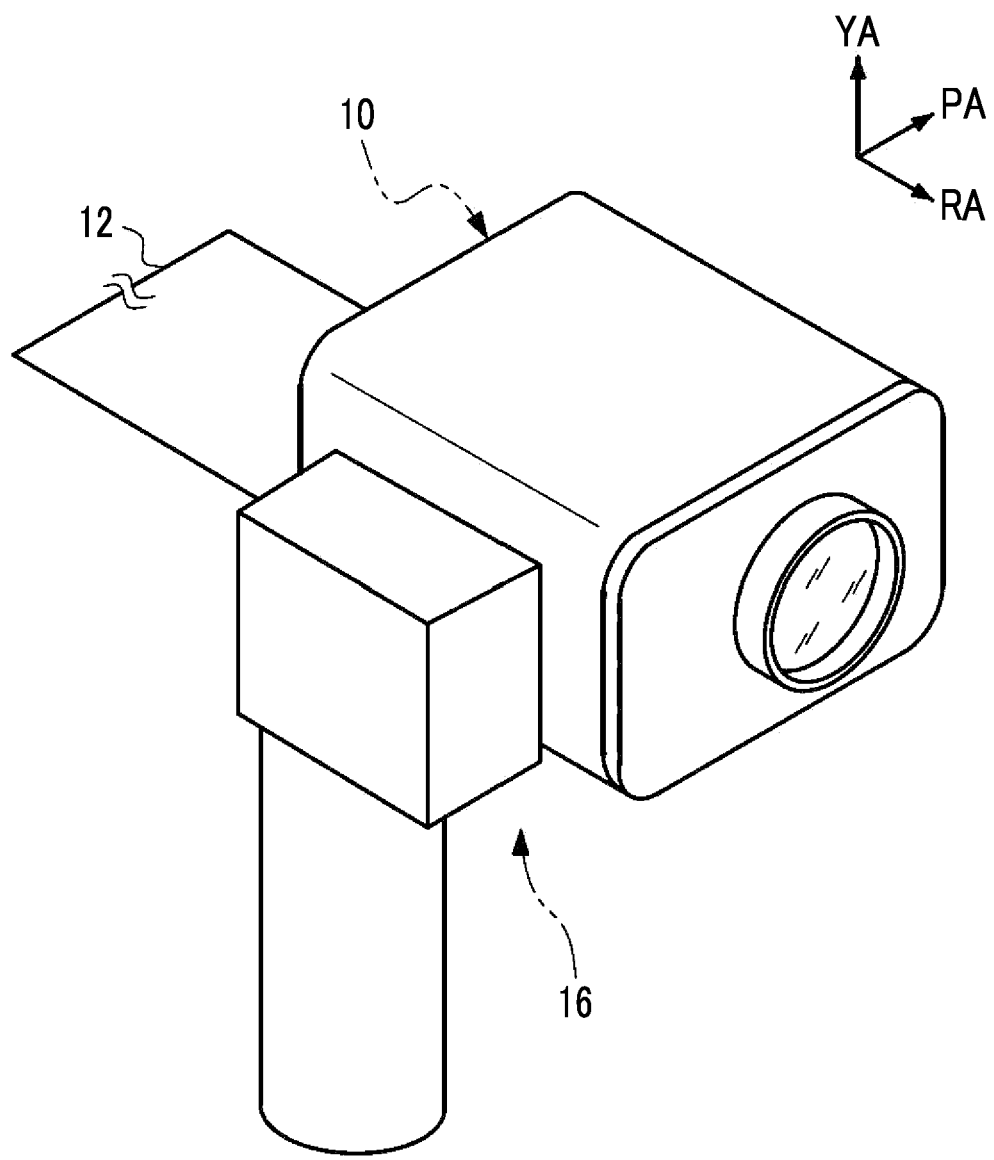
FIG. 26 is a perspective view illustrating an example of the exterior of the surveillance camera according to the embodiment.
Figure 27:
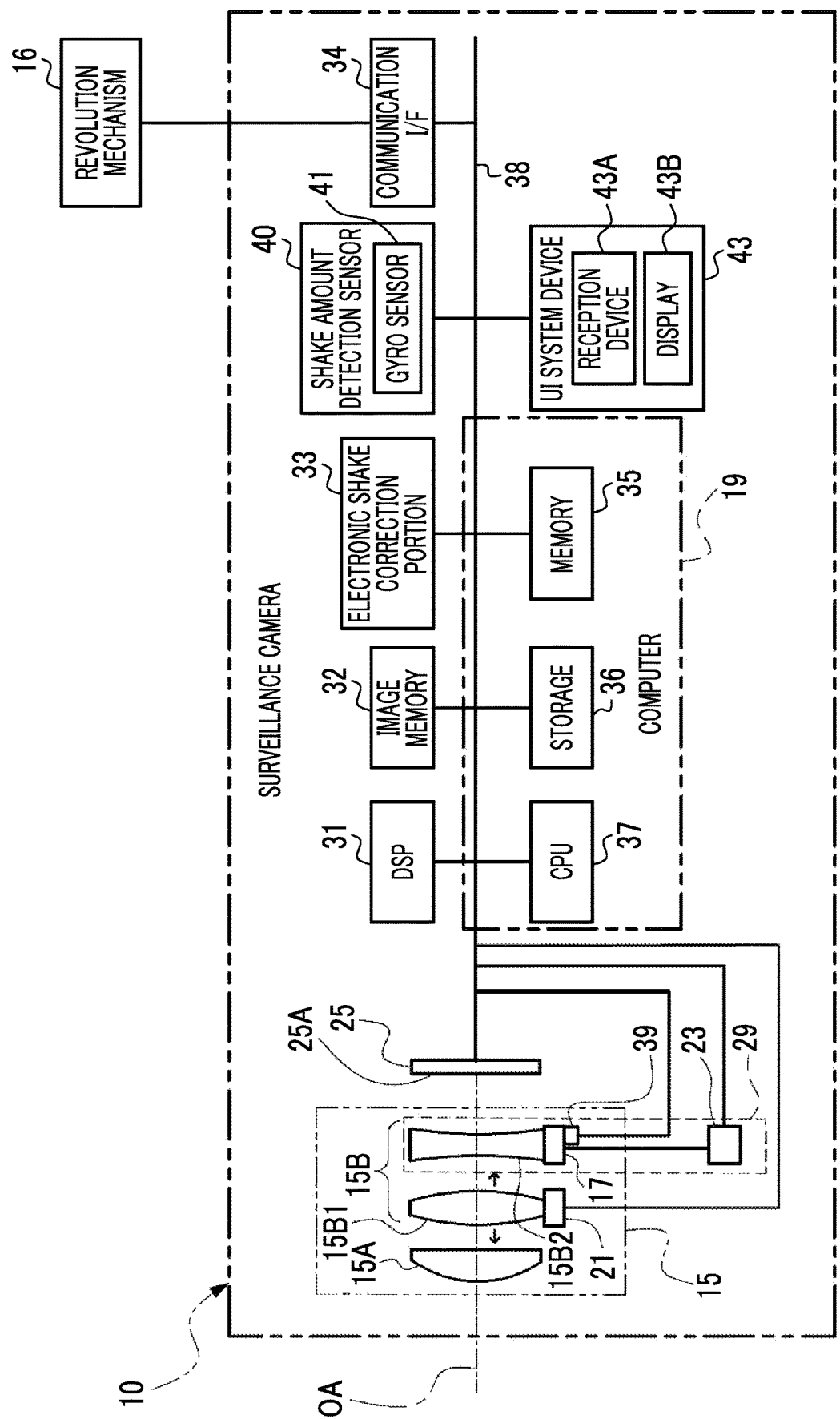
FIG. 27 is a block diagram illustrating an example of a configuration of the electric system of the surveillance camera and the revolution mechanism according to the embodiment.
Figure 28:
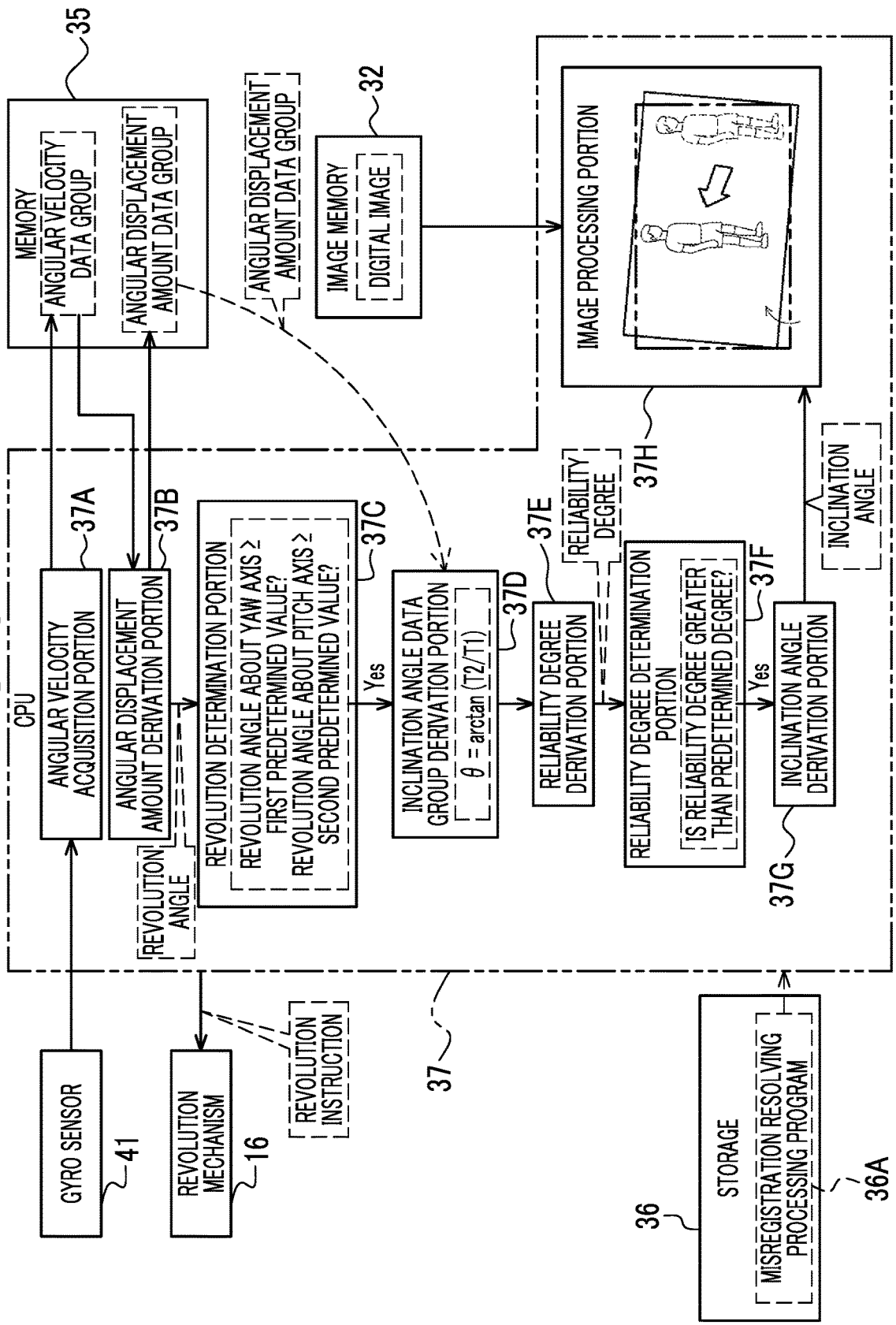
FIG. 28 is a function block diagram illustrating a modification example of the functions of the CPU included in the surveillance camera according to the embodiment.

In the surveillance camera 10 according to the second embodiment, as illustrated in FIG. 26 as an example, the surveillance camera 10 and the revolution mechanism 16 are communicably connected through the communication line 12. Specifically, as illustrated in FIG. 27 as an example, the revolution mechanism 16 and the surveillance camera 10 are communicably connected through the communication I/F 34 of the surveillance camera 10. In the present embodiment, as illustrated in FIG. 28 as an example, a revolution instruction signal related to a revolution operation necessary for deriving the angle θ of the inclination is output to the revolution mechanism 16 from the CPU 37. The revolution mechanism 16 causes the surveillance camera 10 to revolve based on the revolution instruction signal.

As described above, according to the surveillance camera 10 of the second embodiment, the user does not need to cause the revolution mechanism 16 to revolve in deriving the angle θ of the inclination, and convenience of use in deriving the inclination angle is improved compared to a case where the user causes the revolution mechanism 16 to revolve through the management apparatus 11.

Third Embodiment

In the first embodiment and the second embodiment, a case where the misregistration of the captured image is adjusted by the image processing is described. In a present third embodiment, a case of resolving the misregistration of the captured image by rotating the imaging element 25 will be described. In the third embodiment, the same constituents as in the first embodiment and the second embodiment will be designated by the same reference numerals and will not be described. Hereinafter, parts different from the first and second embodiments will be described.

Figure 29:
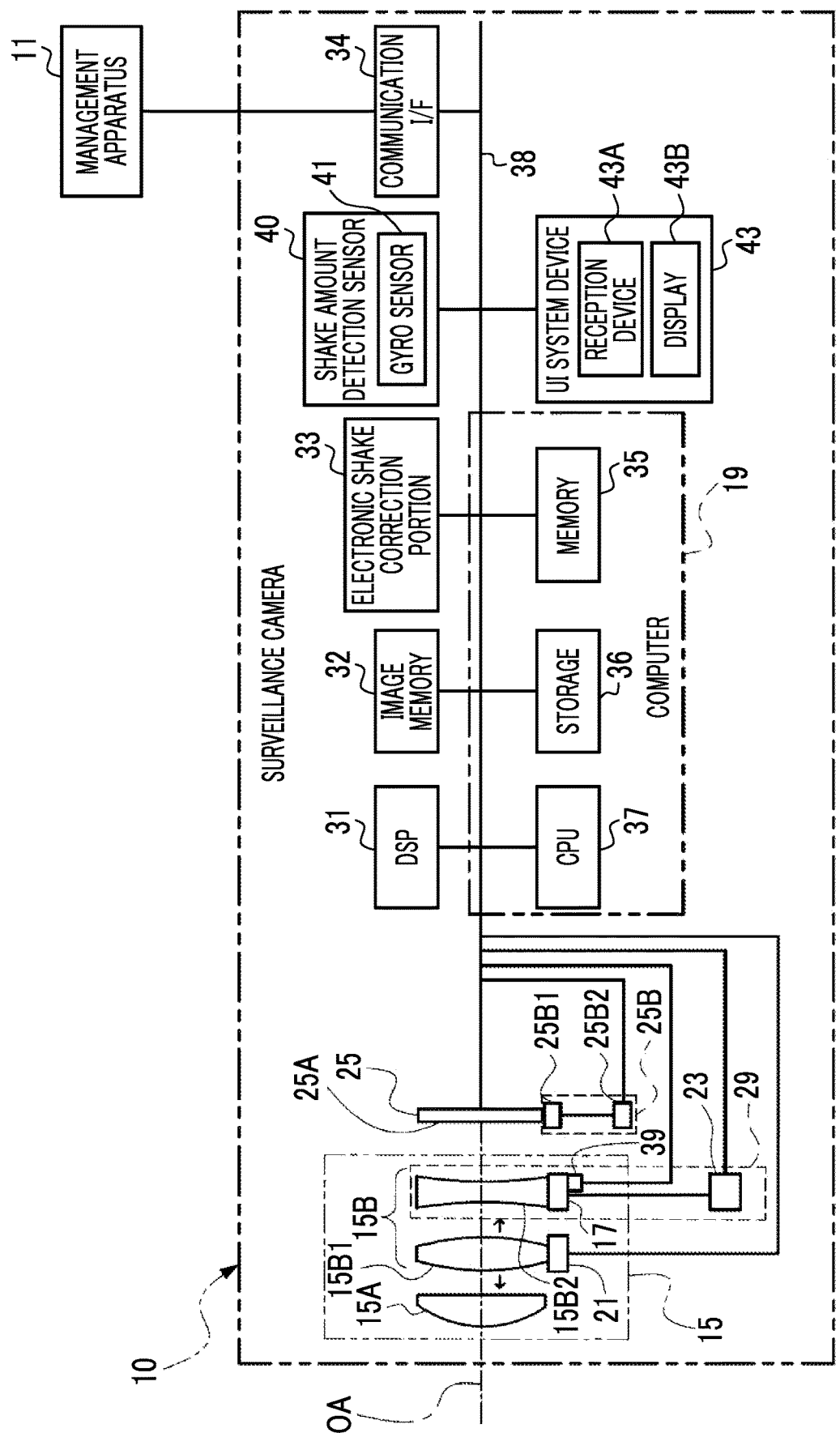
FIG. 29 is a block diagram illustrating a modification example of the configuration of the optical system and the electric system of the surveillance camera according to the embodiment.

In the surveillance camera 10 according to the present embodiment, as illustrated in FIG. 29 as an example, the surveillance camera 10 comprises an imaging element rotation mechanism 25B that rotates the imaging element 25. Specifically, an actuator 25B1 is attached to the imaging element 25 as the imaging element rotation mechanism 25B. The actuator 25B1 is a shift mechanism in which a voice coil motor is mounted, and rotates the imaging element 25 in a rotation direction about the optical axis OA as a central axis by driving the voice coil motor. Here, while the shift mechanism in which the voice coil motor is mounted is employed as the actuator 25B1, the disclosed technology is not limited thereto. Other motive power sources such as a stepping motor or a piezo element may be applied instead of the voice coil motor. The imaging element rotation mechanism 25B is an example of an "imaging element rotation mechanism" according to the embodiment of the disclosed technology.

The actuator 25B1 is controlled by a driver 25B2. Driving the actuator 25B1 under control of the driver 25B2 mechanically changes a position of the imaging element 25 in the rotation direction about the optical axis OA as a central axis.

Figure 30:
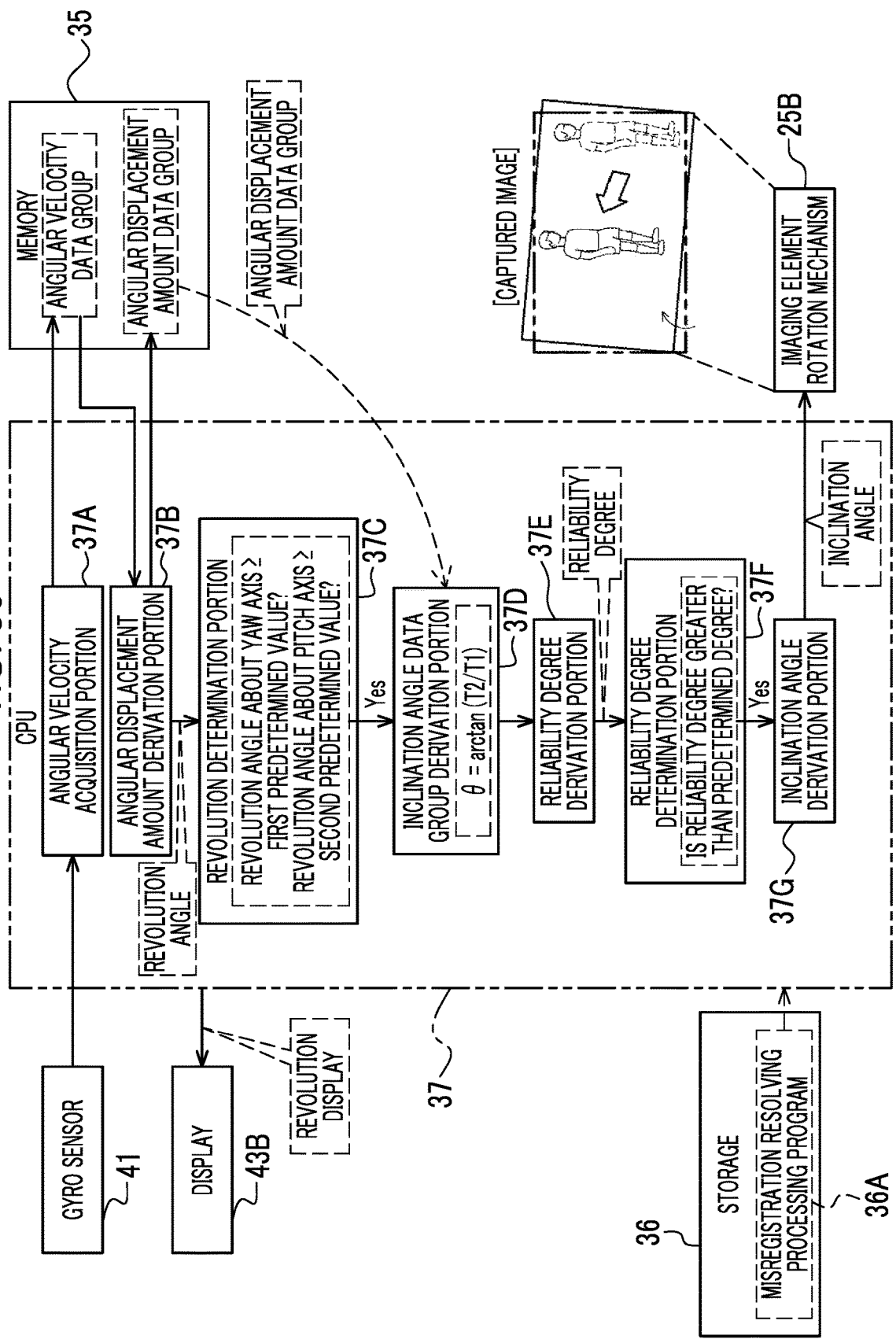
FIG. 30 is a function block diagram illustrating a modification example of the functions of the CPU included in the surveillance camera according to the embodiment.

As illustrated in FIG. 30 as an example, the imaging element rotation mechanism 25B rotates the imaging element 25 of the surveillance camera 10 based on a signal related to the inclination angle from the CPU 37. Accordingly, the imaging range of the imaging element 25 rotates. Consequently, the misregistration of the captured image due to the inclination of the surveillance camera 10 with respect to the revolution mechanism 16 is resolved.

As described above, according to the surveillance camera 10 of the third embodiment, the position of the captured image is adjusted by a mechanical mechanism that is the imaging element rotation mechanism 25B. Thus, the misregistration of the captured image due to the inclination of the surveillance camera 10 with respect to the revolution mechanism 16 is resolved without excessively increasing a processing load in the CPU 37.

An imaging element moving type shake correction mechanism as the mechanical shake correction portion 29 may be used as the imaging element rotation mechanism 25B of the embodiment.

In addition, in the embodiment, while an example of a form in which the position of the captured image is adjusted by the imaging element rotation mechanism 25B instead of the image processing is illustrated, the disclosed technology is not limited thereto. For example, the image processing of the captured image by the image processing portion 37H in the CPU 37 and the rotation of the imaging element 25 by the imaging element rotation mechanism 25B may be used together. Specifically, as an example, first, the imaging element rotation mechanism 25B rotates the imaging element 25 in the direction in which the misregistration of the captured image is resolved. Furthermore, in the rotation of the imaging element 25 by the imaging element rotation mechanism 25B, in a case where the misregistration of the captured image cannot be resolved, the image processing of the captured image is performed in the image processing portion 37H based on the angle θ of the inclination. Consequently, the misregistration of the captured image due to the inclination of the surveillance camera 10 is resolved.

In each of the embodiments, while a device including an ASIC and an FPGA is illustrated as the processor, the disclosed technology is not limited thereto. Various processing may be implemented by a software configuration using a computer.

Figure 31:
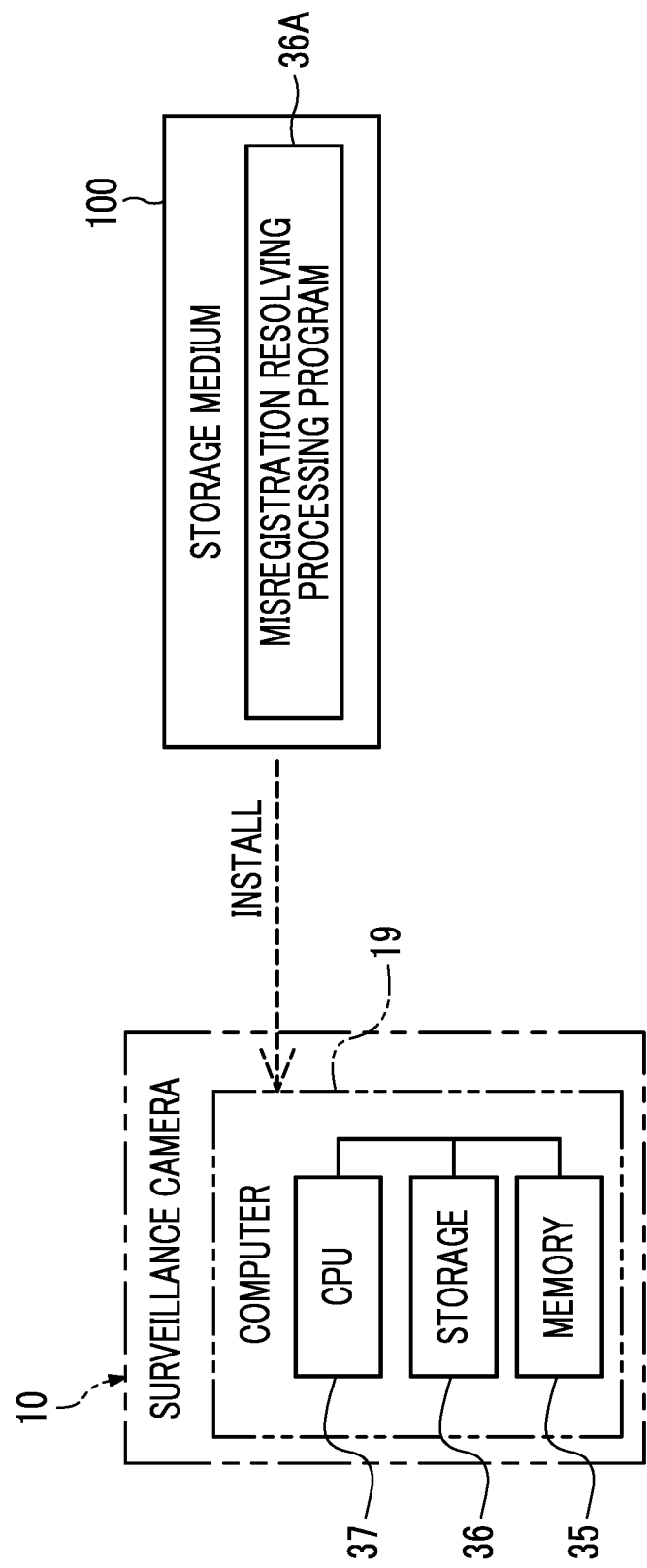
FIG. 31 is a conceptual diagram illustrating an example of an aspect in which a misregistration resolving processing program is installed on a computer in the surveillance camera from a storage medium storing the misregistration resolving processing program according to the embodiment.

In this case, for example, as illustrated in FIG. 31, the computer 19 is incorporated in the surveillance camera 10. The misregistration resolving processing program 36A causing the computer 19 to execute the misregistration resolving processing according to each of the embodiments is stored in a storage medium 100 that is a non-transitory storage medium. Examples of the storage medium 100 include any portable storage medium such as an SSD or a USB memory.

The computer 19 comprises a memory 35, a storage 36, and a CPU 37. The storage 36 is a non-volatile storage device such as an EEPROM, and the memory 35 is a volatile storage device such as a RAM. The misregistration resolving processing program 36A stored in the storage medium 100 is installed on the computer 19. The CPU 37 executes the misregistration resolving processing in accordance with the misregistration resolving processing program 36A.

The misregistration resolving processing program 36A may be stored in the storage 36 instead of the storage medium 100. In this case, the CPU 37 reads out the misregistration resolving processing program 36A from the storage 36 and executes the read misregistration resolving processing program 36A on the memory 35. In such a manner, the misregistration resolving processing is implemented by executing the misregistration resolving processing program 36A by the CPU 37.

In addition, the misregistration resolving processing program 36A may be stored in a storage portion of another computer, a server apparatus, or the like connected to the computer 19 through a communication network (not illustrated), and the misregistration resolving processing program 36A may be downloaded and installed on the computer 19 in response to a request of the surveillance camera 10.

In the storage portion of the other computer, the server apparatus, or the like connected to the computer 19 or in the storage 36, the entire misregistration resolving processing program 36A does not need to be stored, and a part of the misregistration resolving processing program 36A may be stored.

In the example illustrated in FIG. 31, while an example of an aspect of incorporating the computer 19 in the surveillance camera 10 is illustrated, the disclosed technology is not limited thereto. For example, the computer 19 may be provided outside the surveillance camera 10.

In the example illustrated in FIG. 31, while the CPU 37 is a single CPU, the CPU 37 may include a plurality of CPUs. In addition, a GPU may be applied instead of the CPU 37.

In the example illustrated in FIG. 31, while the computer 19 is illustrated, the disclosed technology is not limited thereto. A device including an ASIC, an FPGA, and/or a PLD may be applied instead of the computer 19. In addition, a combination of a hardware configuration and a software configuration may be used instead of the computer 19.

Various processors illustrated below can be used as a hardware resource for executing the misregistration resolving processing described in each of the embodiments. Examples of the processors include a CPU that is a general-purpose processor functioning as the hardware resource for executing the misregistration resolving processing by executing software, that is, the program. In addition, examples of the processors include a dedicated electric circuit such as an FPGA, a PLD, or an ASIC that is a processor having a circuit configuration dedicatedly designed to execute specific processing. Any of the processors incorporates or is connected to a memory, and any of the processors executes the misregistration resolving processing using the memory.

The hardware resource for executing the misregistration resolving processing may be configured with one of those various processors or may be configured with a combination of two or more processors of the same type or different types (for example, a combination of a plurality of FPGAs or a combination of a CPU and an FPGA). In addition, the hardware resource for executing the misregistration resolving processing may be one processor.

Examples of a configuration with one processor include, first, a form in which one processor is configured with a combination of one or more CPUs and software, and the processor functions as the hardware resource for executing the misregistration resolving processing. Second, as represented by an SoC or the like, a form of using a processor that implements, by one IC chip, functions of the entire system including a plurality of hardware resources for executing the misregistration resolving processing is included. In such a manner, the misregistration resolving processing is implemented using one or more of the various processors as the hardware resource.

Furthermore, more specifically, an electric circuit in which circuit elements such as semiconductor elements are combined can be used as a hardware structure of those various processors. In addition, the misregistration resolving processing is merely an example. Accordingly, unnecessary steps may be deleted, new steps may be added, or a processing order may be rearranged without departing from the gist of the disclosed technology.

In addition, while the surveillance camera 10 is illustrated in the example illustrated in FIG. 1, the disclosed technology is not limited thereto. That is, the disclosed technology can be applied to various electronic apparatuses (for example, a lens-interchangeable camera, a fixed lens camera, a smart device, a personal computer, and/or a wearable terminal apparatus or the like) incorporating the imaging apparatus. Even with these electronic apparatuses, the same actions and effects as the surveillance camera 10 are obtained.

In addition, in each of the embodiments, while the display 43B is illustrated as the "display portion (display)" according to the embodiment of the disclosed technology, the disclosed technology is not limited thereto. Examples of the "display portion (display)" according to the embodiment of the disclosed technology may include a separate display that is connected to the imaging apparatus.

Above described contents and illustrated contents are detailed description for parts according to the embodiment of the disclosed technology and are merely an example of the disclosed technology. For example, description related to the above configurations, functions, actions, and effects is description related to an example of configurations, functions, actions, and effects of the parts according to the embodiment of the disclosed technology. Thus, unnecessary parts may be removed, new elements may be added, or parts may be replaced in the above described contents and the illustrated contents without departing from the gist of the disclosed technology. In addition, particularly, description related to common technical knowledge or the like that does not need to be described in terms of embodying the disclosed technology is omitted in the above described contents and the illustrated contents in order to avoid complication and facilitate understanding of the parts according to the embodiment of the disclosed technology.

In the present specification, "A and/or B" has the same meaning as "at least one of A or B". This means that "A and/or B" may be only A, only B, or a combination of A and B. In addition, in the present specification, the same approach as "A and/or B" is applied to a case where three or more matters are represented by connecting the matters with "and/or".

All documents, patent applications, and technical standards disclosed in the present specification are incorporated in the present specification by reference to the same extent as in a case where each of the documents, patent applications, technical standards are specifically and individually indicated to be incorporated by reference.

What is claimed is:

1. An imaging support device comprising:
 a processor; and
 a memory that is connected to or incorporated in the processor,
 wherein the processor is configured to:
  derive an inclination angle of an imaging apparatus with respect to a revolution mechanism that enables the imaging apparatus to revolve about each of a first axis and a second axis intersecting with the first axis as a central axis, based on a time series change in revolution angle of the imaging apparatus, the inclination angle of the imaging apparatus indicating inclination in a rotation direction about a third axis intersecting with the first axis and the second axis as a central axis, and adjust a position of a captured image obtained by imaging performed by the imaging apparatus based on the inclination angle.

2. The imaging support device according to claim 1, wherein the inclination angle is derived by the processor based on the time series change in a state where the imaging apparatus is caused to revolve about the first axis or the second axis as a central axis by the revolution mechanism.

3. The imaging support device according to claim 2, wherein the inclination angle is derived by the processor based on the time series change in a state where the imaging apparatus is caused to revolve in one direction of a revolution direction about the first axis or the second axis as a central axis.

4. The imaging support device according to claim 2, wherein the inclination angle is derived by the processor in a case where an amount of change in revolution angle about the first axis as a central axis is greater than or equal to a first predetermined value, and an amount of change in revolution angle about the second axis as a central axis is greater than or equal to a second predetermined value.

5. The imaging support device according to claim 1, wherein the inclination angle is an angle of the inclination of the imaging apparatus with respect to a central axis of the revolution by the revolution mechanism.

6. The imaging support device according to claim 5, wherein the processor is configured to derive the inclination angle based on a degree of difference between a displacement amount of the revolution angle per unit time period about the first axis and a displacement amount of the revolution angle per unit time period about the second axis.

7. The imaging support device according to claim 6, wherein the degree of difference is a ratio of the displacement amount of the revolution angle per unit time period about the first axis and the displacement amount of the revolution angle per unit time period about the second axis.

8. The imaging support device according to claim 5, wherein the processor is configured to derive the inclination angle based on Expression (1) below in a state where the imaging apparatus is caused to revolve about the first axis or the second axis as a central axis by the revolution mechanism:

$$\theta = \arctan(T2/T1) \quad \text{Expression (1)}$$

θ: the inclination angle of the imaging apparatus (degree)
T1: the displacement amount of the revolution angle per unit time period about one axis of the first axis or the second axis (degree/s)
T2: the displacement amount of the revolution angle per unit time period about the other axis of the first axis or the second axis (degree/s).

9. The imaging support device according to claim 1, wherein the processor is configured to derive a reliability degree of to the inclination angle and, in a case where the derived reliability degree is greater than a predetermined degree, adjust the position based on to the inclination angle.

10. The imaging support device according to claim 9, wherein the reliability degree is a standard deviation of a data group of the inclination angle, and the processor is configured to, in a case where the standard deviation is less than or equal to a threshold value, adjust the position based on the inclination angle.

11. The imaging support device according to claim 1, wherein the imaging apparatus includes a sensor that detects the rotation direction and a rotation speed of the imaging apparatus, and the time series change is derived by the processor based on a detection result of the sensor.

12. The imaging support device according to claim 11, wherein the sensor is a gyro sensor that detects an angular velocity about the first axis or the second axis as a central axis.

13. The imaging support device according to claim 1, wherein the processor is configured to perform image processing of rotating the captured image in a direction in which inclination of the captured image due to the inclination of the imaging apparatus is resolved, based on the inclination angle.

14. The imaging support device according to claim 1, wherein the imaging apparatus includes an imaging element rotation mechanism that rotates an imaging element, and the processor is configured to rotate the imaging element in a direction in which inclination of the captured image due to the inclination of the imaging apparatus is resolved, by operating the imaging element rotation mechanism based on the inclination angle.

15. The imaging support device according to claim 1, wherein the processor is configured to perform at least one of a control of displaying an image on which an adjustment result of the position of the captured image is reflected based on the inclination angle on a display, or a control of storing image data indicating the image on which the adjustment result is reflected in the memory.

16. The imaging support device according to claim 1, wherein the processor is configured to perform at least one of a control of displaying an image on which an adjustment result of the position of the captured image is reflected based on the inclination angle on a display, or a control of storing image data indicating the image on which the adjustment result is reflected in a storage.

17. An imaging apparatus comprising:
the imaging support device according to claim 1; and
an imaging element,
wherein the imaging element generates the captured image by performing imaging.

18. An imaging system comprising:
the imaging support device according to claim 1; and
the imaging apparatus,
wherein the imaging apparatus generates the captured image by performing imaging.

19. The imaging system according to claim 18, further comprising:
a revolution mechanism,
wherein the revolution mechanism causes the imaging apparatus to revolve about each of the first axis and the second axis as a central axis.

20. An imaging support method of supporting imaging performed by an imaging apparatus, the imaging support method comprising:
  deriving an inclination angle of the imaging apparatus with respect to a revolution mechanism that enables the imaging apparatus to revolve about each of a first axis and a second axis intersecting with the first axis as a central axis, based on a time series change in revolution angle of the imaging apparatus, the inclination angle of the imaging apparatus indicating inclination in a rotation direction about a third axis intersecting with the first axis and the second axis as a central axis; and
  adjusting a position of a captured image obtained by imaging performed by the imaging apparatus based on the inclination angle.

21. A non-transitory computer-readable storage medium storing a program executable by a computer to perform a process of supporting imaging performed by an imaging apparatus, the process comprising:
  deriving an inclination angle of the imaging apparatus with respect to a revolution mechanism that enables the imaging apparatus to revolve about each of a first axis and a second axis intersecting with the first axis as a central axis, based on a time series change in revolution angle of the imaging apparatus, the inclination angle of the imaging apparatus indicating inclination in a rotation direction about a third axis intersecting with the first axis and the second axis as a central axis; and
  adjusting a position of a captured image obtained by imaging performed by the imaging apparatus based on the inclination angle.

\* \* \* \* \*